(12) United States Patent
Fan et al.

(10) Patent No.: US 12,052,727 B2
(45) Date of Patent: Jul. 30, 2024

(54) DATA TRANSMISSION METHOD AND APPARATUS

(71) Applicant: Huawei Technologies Co., Ltd., Shenzhen (CN)

(72) Inventors: Qiang Fan, Hefei (CN); Xiaoying Xu, Shanghai (CN); Chong Lou, Shanghai (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 17/489,455

(22) Filed: Sep. 29, 2021

(65) Prior Publication Data

US 2022/0022239 A1    Jan. 20, 2022

Related U.S. Application Data

(63) Continuation of application No. PCT/CN2020/081511, filed on Mar. 26, 2020.

(30) Foreign Application Priority Data

Mar. 29, 2019  (CN) .......................... 201910253508.5
Apr. 3, 2019   (CN) .......................... 201910268136.3

(51) Int. Cl.
*H04W 72/23*   (2023.01)
*H04L 1/08*    (2006.01)

(52) U.S. Cl.
CPC ............... *H04W 72/23* (2023.01); *H04L 1/08* (2013.01)

(58) Field of Classification Search
None
See application file for complete search history.

(56) References Cited

U.S. PATENT DOCUMENTS 11,272,568 B2 *   3/2022  Shi ............................ H04L 1/08
2018/0139030 A1 * 5/2018  Kim ....................... H04W 72/20
(Continued)

FOREIGN PATENT DOCUMENTS

CN   107147479 A    9/2017
CN   107241164 A   10/2017
(Continued)

OTHER PUBLICATIONS

"3rd Generation Partnership Project; Technical Specification Group Radio Access Network; NR; Medium Access Control (MAC) protocol specification (Release 15)," 3GPP TS 38.321 V15.4.0, pp. 1-77, 3GPP TS 36.331 V15.4.0, pp. 1-933, 3rd Generation Partnership Project, Valbonne, France (Dec. 2018).

(Continued)

*Primary Examiner* — Clemence S Han
(74) *Attorney, Agent, or Firm* — Leydig, Voit & Mayer, Ltd.

(57) ABSTRACT

A data transmission method and corresponding apparatus are provided. The method implemented by a terminal device includes: receiving indication information from a network device, where the indication information includes a bit sequence, a value of an $i^{th}$ bit in the bit sequence indicates a usage status of an $i^{th}$ logical channel in M logical channels associated with a radio bearer, and a duplication transmission function is configured for the radio bearer; transmitting data based on the indication information through at least one logical channel associated with the radio bearer. According to the application, the M logical channels are sorted based on IDs of cell groups associated with the M logical channels and IDs of the M logical channels, and the $i^{th}$ bit indicates the usage status of the $i^{th}$ logical channel, thereby enabling the terminal transmitting data via at least one logical channel associated with the radio bearer.

16 Claims, 12 Drawing Sheets

(56) References Cited

U.S. PATENT DOCUMENTS

| | | | |
|---|---|---|---|
| 2018/0270699 A1 | 9/2018 | Babaei et al. | |
| 2018/0368107 A1 | 12/2018 | Babaei et al. | |
| 2020/0092746 A1* | 3/2020 | Baek | H04L 1/08 |
| 2020/0169888 A1* | 5/2020 | Yang | H04L 63/205 |
| 2020/0221538 A1* | 7/2020 | Liu | H04L 69/18 |
| 2020/0367091 A1* | 11/2020 | Xu | H04W 80/02 |
| 2021/0144583 A1* | 5/2021 | Xiao | H04W 28/04 |
| 2021/0195618 A1* | 6/2021 | Yuan | H04W 72/535 |
| 2021/0400529 A1* | 12/2021 | Wang | H04L 1/08 |
| 2022/0014961 A1* | 1/2022 | Baek | H04L 1/08 |

FOREIGN PATENT DOCUMENTS

| | | |
|---|---|---|
| CN | 107342851 A | 11/2017 |
| CN | 107438976 A | 12/2017 |
| CN | 108282823 A | 7/2018 |
| CN | 108370304 A | 8/2018 |
| CN | 108632902 A | 10/2018 |
| CN | 109150388 A | 1/2019 |
| CN | 109151903 A | 1/2019 |
| EP | 3876659 A1 | 9/2021 |
| EP | 3897060 A1 | 10/2021 |
| WO | 2018029537 A1 | 2/2018 |
| WO | 2018170891 A1 | 9/2018 |
| WO | 2018204828 A1 | 11/2018 |
| WO | 2018221926 A1 | 12/2018 |
| WO | 2018228289 A1 | 12/2018 |
| WO | 2018231022 A1 | 12/2018 |

OTHER PUBLICATIONS

"3rd Generation Partnership Project; Technical Specification Group Radio Access Network; NR; NR and NG-RAN Overall Description; Stage 2 (Release 15)," 3GPP TS 38.300 V15.4.0, pp. 1-97, 3GPP TS 36.331 V15.4.0, pp. 1-933, 3rd Generation Partnership Project, Valbonne, France (Dec. 2018).

"3rd Generation Partnership Project; Technical Specification Group Radio Access Network; NR; Packet Data Convergence Protocol (PDCP) specification (Release 15)," 3GPP TS 38.323 V15.4.0, pp. 1-26, 3rd Generation Partnership Project, Valbonne, France (Dec. 2018).

"3rd Generation Partnership Project; Technical Specification Group Radio Access Network; NR; Radio Resource Control (RRC) protocol specification (Release 15)," 3GPP TS 38.331 V15.4.0, pp. 1-474, 3rd Generation Partnership Project, Valbonne, France (Dec. 2018).

Ericsson, "104_ 40NR_IIOT PDCP duplication report of email discussion, TP," D3GPP TSG-RAN WG2 #105, Athens, Greece, R2-1901367, total 29 pages, 3rd Generation Partnership Project, Valbonne, France (Feb. 25-Mar. 1, 2019).

Nokia et al., "Selective duplication upon transmission failure," 3GPP TSG-RAN WG3 Meeting #103, Athens, Greece, R3-190217, Total 4 pages 3rd Generation Partnership Project, Valbonne, France (Feb. 25-Mar. 1, 2019).

* cited by examiner

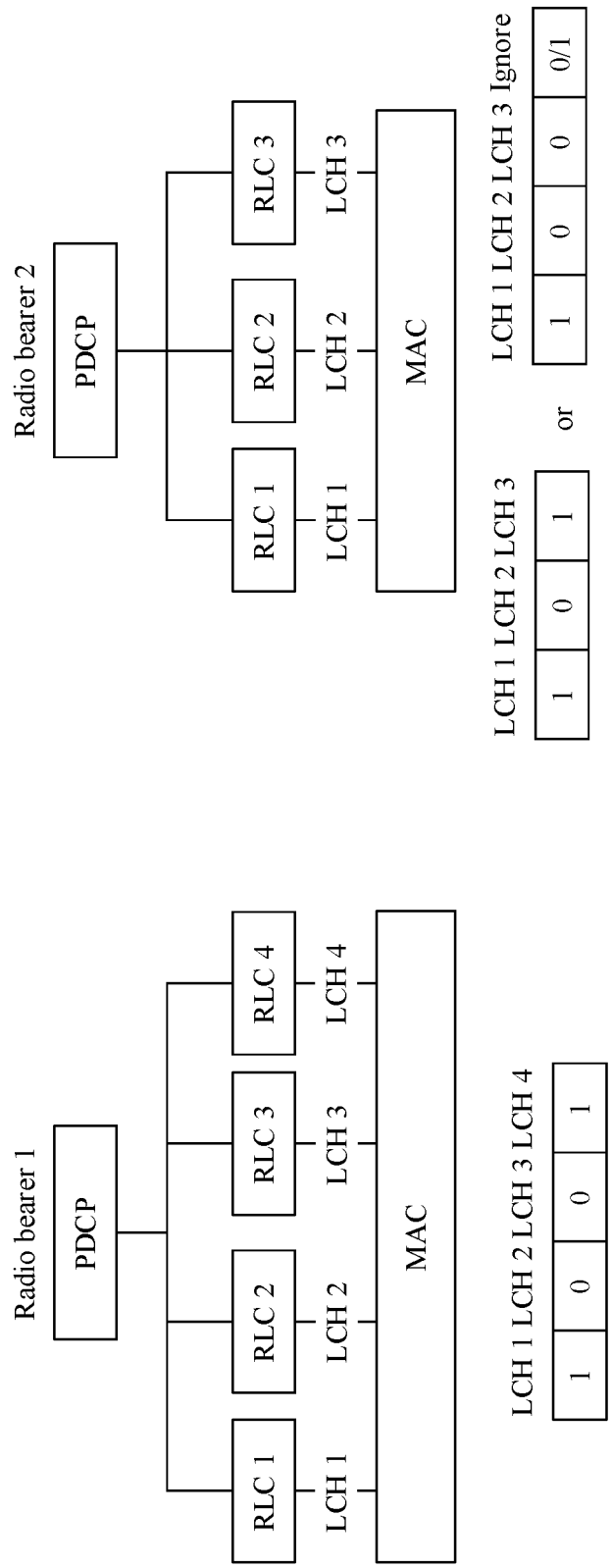

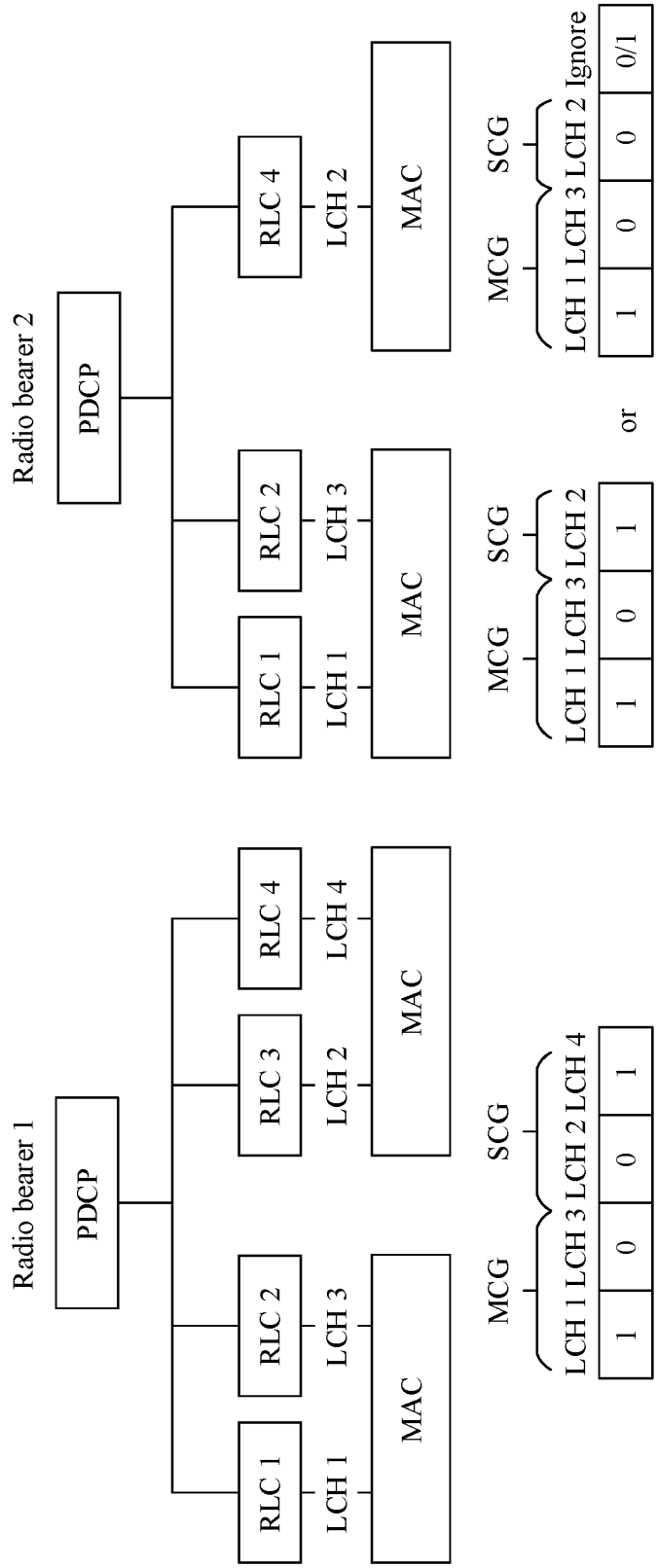

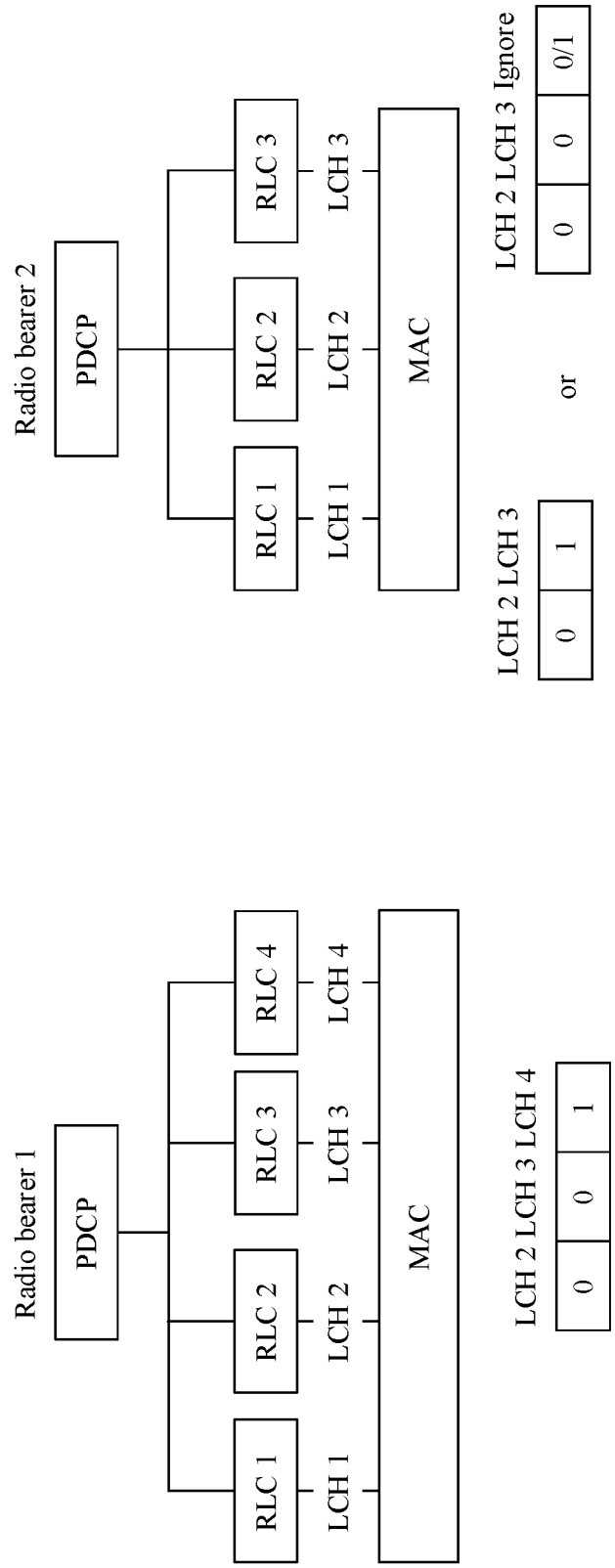

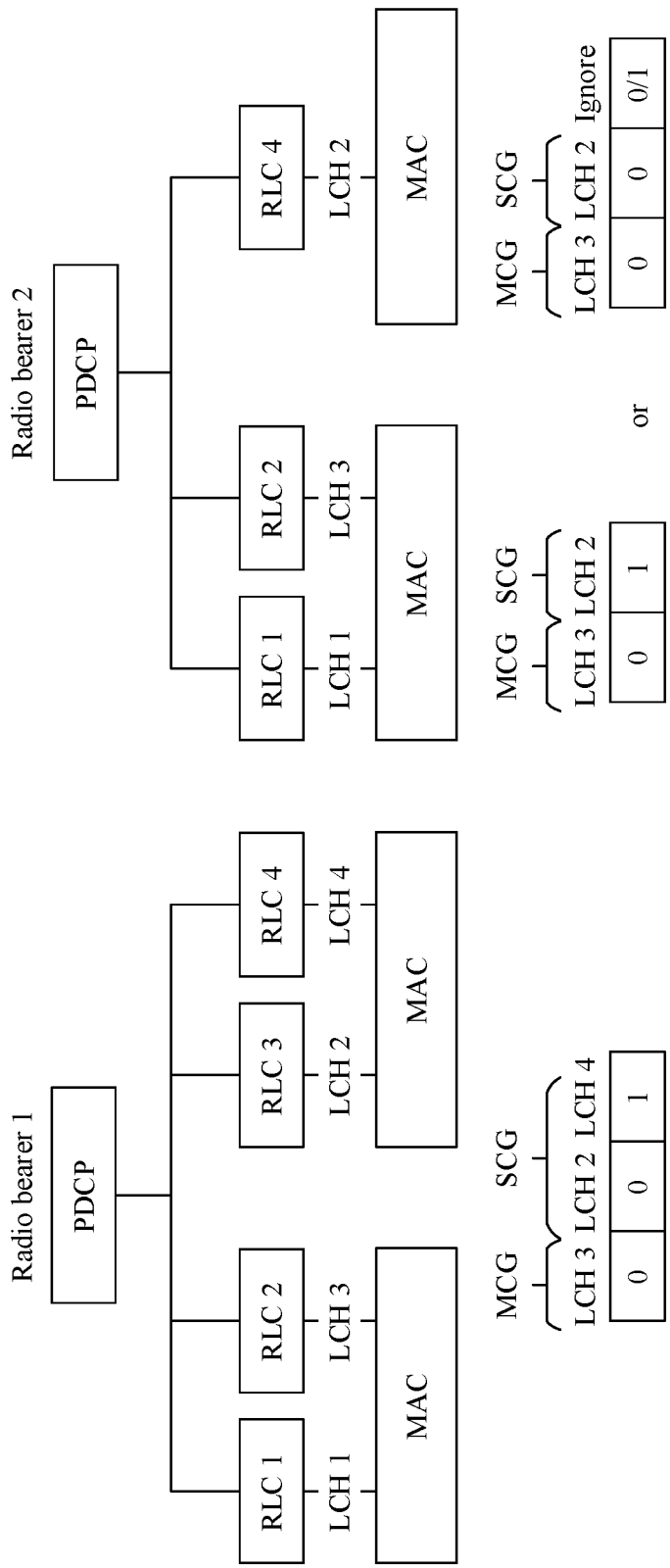

00: Deactivate a duplication transmission function and use only the LCH 1
01: Activate LCH 1+LCH 2
10: Activate LCH 1+LCH 3
11: Activate LCH 1+LCH 4

00: Deactivate a duplication transmission function and use only the LCH 1/fall back to a split bearer
01: Activate LCH 1+LCH 3
10: Activate LCH 1+LCH 2
11: Activate LCH 1+LCH 4

00: Activate LCH 1+LCH 3
01: Activate LCH 2+LCH 4
10: DC duplication
11: DC split bearer

DATA TRANSMISSION METHOD AND APPARATUS

CROSS-REFERENCE TO RELATED APPLICATIONS

This application is a continuation of International Application No. PCT/CN2020/081511, filed on Mar. 26, 2020, which claims priority to Chinese Patent Application No. 201910253508.5, filed on Mar. 29, 2019 and claims priority to Chinese Patent Application No. 201910268136.3, filed on Apr. 3, 2019. All of the aforementioned patent applications are hereby incorporated by reference in their entireties.

TECHNICAL FIELD

Embodiments of this application relate to the field of communications technologies, and in particular, to a data transmission method and an apparatus.

BACKGROUND

A $5^{th}$ generation (5G) communications system may support a plurality of types of services, for example, an ultra-reliable low-latency communication (URLLC) service. To support a service requirement for high reliability and a low latency of the URLLC service, a duplication function of a packet data convergence protocol (PDCP) layer is introduced. Duplication at the PDCP layer usually means that a data packet of a radio bearer is duplicated to two same packets (namely, duplicate packets). Then, the two data packets are separately delivered to two different radio link control (RLC) entities for transmission, and then are transmitted to a media access control (MAC) layer through different logical channels (LCH).

To ensure reliability of data transmission, an original data packet and a duplicated data packet that are transmitted to the MAC layer cannot be transmitted by using a same MAC protocol data unit (PDU), because a loss of one MAC PDU does not affect transmission of the other MAC PDU only when different MAC PDUs are used for transmission. This avoids a situation that the original data packet and the duplicated data packet are discarded at the same time because of the loss of one MAC PDU. Therefore, in a dual connectivity (DC) duplication scenario, the two data packets may be transmitted to different MAC entities through different logical channels, and finally two MAC PDUs are transmitted on different carriers. In a carrier aggregation (CA) duplication scenario, mapping relationships between different logical channels and different carriers may be configured, so that the two data packets are multiplexed into different MAC PDUs at the MAC layer, and finally the data packets are transmitted on different carriers.

Currently, the duplication at the PDCP layer is limited to transmission that is of a data packet duplicated at the PDCP layer and that is performed by one radio bearer through two RLC entities and two logical channels. For example, in the CA duplication scenario, when a duplication transmission function at a PDCP layer of a radio bearer is activated, data from a logical channel 1 can be transmitted only on a carrier 1 or a carrier 2, and data from a logical channel 2 can be transmitted only on a carrier 3. At a moment, after the duplication transmission function at the PDCP layer of the radio bearer is deactivated, only the logical channel 1 is still working. In this case, to increase a transmission capacity, data in the logical channel 1 may be transmitted on all available carriers. However, when the duplication at the PDCP layer is not limited to two logical channels, how a network device controls and uses a logical channel to transmit data still needs to be further studied.

SUMMARY

In view of this, this application provides a data transmission method and an apparatus, to allow, when a plurality of logical channels are configured for a radio bearer, a terminal device to transmit data through at least one logical channel associated with the radio bearer based on an indication of a network device.

According to a first aspect, an embodiment of this application provides a data transmission method. The method may be applied to a terminal device, or may be applied to a chip inside a terminal device. For example, the method is applied to the terminal device. In the method, the terminal device receives indication information from a network device, where the indication information includes a bit sequence, a value of an $i^{th}$ bit in the bit sequence is used to indicate a usage status of an $i^{th}$ logical channel in M logical channels associated with a radio bearer, the M logical channels are sorted based on identifiers IDs of cell groups associated with the M logical channels and IDs of the M logical channels, a duplication transmission function is configured for the radio bearer, i=1, 2, . . . , or M, and M is an integer greater than or equal to 2; and the terminal device transmits data based on the indication information through at least one logical channel associated with the radio bearer.

According to the foregoing method, because the M logical channels associated with the radio bearer may be sorted based on the IDs of the cell groups associated with the M logical channels and the IDs of the M logical channels, the usage status of the $i^{th}$ logical channel in the M logical channels may be indicated by using the $i^{th}$ bit in the bit sequence included in the indication information, so that the terminal device can transmit data based on the indication information through the at least one logical channel associated with the radio bearer.

In a possible design, a quantity of bits in the bit sequence is N, and N is an integer greater than M; and the method further includes: The terminal device ignores an $(M+1)^{th}$ bit to an $N^{th}$ bit in the bit sequence.

In other words, when the quantity of bits in the bit sequence is relatively large, the terminal device may ignore a redundant bit. In this method, the quantity of bits in the bit sequence may be a fixed value (namely, N), to avoid complexity caused by adjusting the quantity of bits in the bit sequence.

In a possible design, the usage status of the $i^{th}$ logical channel is active or inactive; and
if the usage status of the $i^{th}$ logical channel is active, the $i^{th}$ logical channel is allowed to be used for duplication data transmission; or if the usage status of the $i^{th}$ logical channel is inactive, the $i^{th}$ logical channel is prohibited from being used for duplication data transmission.

In a possible design, that the terminal device transmits data based on the indication information through at least one logical channel associated with the radio bearer includes: The terminal device transmits data based on usage statuses of the M logical channels through at least a logical channel that is in the M logical channels and whose usage status is active.

In other words, if the indication information indicates that a logical channel in the M logical channels is active, the terminal device may transmit data through the logical channel. If the indication information indicates that a logical channel in the M logical channels is inactive, the terminal device does not transmit data through the logical channel. In this manner, the terminal device may determine, based on indication of the indication information, the logical channel used to transmit data. The indication manner is relatively simple and convenient.

In a possible design, that the terminal device transmits data based on usage statuses of the M logical channels through at least a logical channel that is in the M logical channels and whose usage status is active includes: If the M bits indicate that usage statuses of K1 logical channels in the M logical channels are active, and 0<K1≤P, the terminal device transmits data through the K1 logical channels, where when K1 is greater than 1, the data transmitted through the K1 logical channels is duplicated, and P is a maximum quantity of logical channels that are in logical channels associated with the radio bearer and that are active.

In a possible design, the method further includes:
when the M logical channels are all associated with a first cell group, if K1=0, the terminal device transmits data through any one of the M logical channels, or the terminal device ignores the indication information or the bit sequence; or
when a first part of logical channels in the M logical channels are associated with a first cell group and a second part of logical channels in the M logical channels are associated with a second cell group, if K1=0, the terminal device transmits data through a first logical channel in the M logical channels, or the terminal device performs non-duplication data transmission through a second logical channel in the first cell group and a third logical channel in the second cell group, or the terminal device ignores the indication information or the bit sequence.

In this way, the M bits in the bit sequence are all 0 to indicate some operations, to increase diversity of content indicated by the bit sequence.

In a possible design, the method further includes: if K1>P, the terminal device transmits data through P logical channels in the K1 logical channels, where the data transmitted through the P logical channels is duplicated.

In a possible design, the logical channels associated with the radio bearer include the M logical channels and a primary logical channel; and that the terminal device transmits data based on usage statuses of the M logical channels through at least a logical channel that is in the M logical channels and whose usage status is active includes: If the M bits indicate that usage statuses of K2 logical channels in the M logical channels are active, and 0<K2≤P−1, the terminal device transmits data through the K2 logical channels and the primary logical channel, where the data transmitted through the K2 logical channels and the data transmitted through the primary logical channel are duplicated, and P is a maximum quantity of logical channels that are in the logical channels associated with the radio bearer and that are active.

In a possible design, the method further includes: When the logical channels associated with the radio bearer are all associated with a first cell group, if K2=0, the terminal device transmits data through the primary logical channel, or the terminal device ignores the indication information or the bit sequence; or when a first part of logical channels in the M logical channels are associated with a first cell group, a second part of logical channels in the M logical channels are associated with a second cell group, and the first part of logical channels include the primary logical channel, if K2=0, the terminal device transmits data through the primary logical channel, or the terminal device transmits data through the primary logical channel and a fourth logical channel in the second cell group, where the data transmitted through the primary logical channel and the data transmitted through the fourth logical channel are not duplicated, or the terminal device ignores the indication information or the bit sequence.

In this way, the M bits in the bit sequence are all 0 to indicate some operations, to increase diversity of content indicated by the bit sequence.

In a possible design, the method further includes: If K2>P−1, the terminal device transmits data through P−1 logical channels in the K2 logical channels and the primary logical channel, where the data transmitted through the P−1 logical channels and the data transmitted through the primary logical channel are duplicated.

In a possible design, that the M logical channels are sorted based on identifiers IDs of cell groups associated with the M logical channels and IDs of the M logical channels includes: The M logical channels are sorted in ascending or descending order based on IDs of logical channels associated with each cell group, where logical channels associated with a cell group with a larger ID are ranked first, or logical channels associated with a cell group with a smaller ID are ranked first; or the M logical channels are sorted in ascending or descending order based on values respectively corresponding to the M logical channels, where the M logical channels include the first logical channel, and a value corresponding to the first logical channel is obtained based on an ID of a cell group to which the first logical channel belongs, an ID of the first logical channel, and a maximum quantity of logical channels included in the cell groups to which the M logical channels belong.

In a possible design, the indication information further includes a location index of the radio bearer in ascending or descending order of at least one radio bearer having the duplication transmission function based on an identifier of the at least one radio bearer.

According to a second aspect, an embodiment of this application provides a data transmission method. The method may be applied to a terminal device, or may be applied to a chip inside a terminal device. For example, the method is applied to the terminal device. In the method, the terminal device receives indication information from a network device, where the indication information includes a bit sequence, values of a plurality of bits in the bit sequence are used to indicate one of a plurality of transmission modes of a radio bearer, a duplication transmission function is configured for the radio bearer, each transmission mode in the plurality of transmission modes includes usage statuses of M logical channels associated with the radio bearer, a quantity of bits in the bit sequence is less than M, and M is an integer greater than or equal to 2; and the terminal device transmits data based on the indication information through at least one logical channel associated with the radio bearer.

In this way, the values of the plurality of bits in the bit sequence are used to indicate the transmission mode of the radio bearer. Because the quantity of bits in the bit sequence may be less than M, a relatively small quantity of bits may be used to indicate the usage statuses of the M logical channels. This can effectively reduce resource overheads.

In a possible design, logical channels associated with the radio bearer include the M logical channels and a primary logical channel; and the plurality of transmission modes include any one or more of the following:

a transmission mode 1, where a usage status of the primary logical channel is active, and usage statuses of other logical channels associated with the radio bearer are inactive;

a transmission mode 2, where usage statuses of the first logical channel in the M logical channels and the primary logical channel are active, usage statuses of other logical channels associated with the radio bearer are inactive, and the data transmitted through the first logical channel and the data transmitted through the primary logical channel are duplicated;

a transmission mode 3, where usage statuses of the second logical channel in the M logical channels and the primary logical channel are active, usage statuses of other logical channels associated with the radio bearer are inactive, and the data transmitted through the second logical channel and the data transmitted through the primary logical channel are duplicated; and a transmission mode 4, where usage statuses of the third logical channel in the M logical channels and the primary logical channel are active, usage statuses of other logical channels associated with the radio bearer are inactive, and the data transmitted through the third logical channel and the data transmitted through the primary logical channel are duplicated, where the M logical channels are sorted based on identifiers IDs of cell groups to which the M logical channels belong and IDs of the M logical channels.

In a possible design, the first logical channel and the second logical channel in the M logical channels are associated with a first cell group, the third logical channel and the fourth logical channel in the M logical channels are associated with a second cell group, and the M logical channels are sorted based on identifiers IDs of cell groups associated with the M logical channels and IDs of the M logical channels; and the plurality of transmission modes of the radio bearer include any one or more of the following:

a transmission mode 1, where usage statuses of the first logical channel and the second logical channel are active, usage statuses of other logical channels associated with the radio bearer are inactive, and the data transmitted through the first logical channel and the data transmitted through the second logical channel are duplicated;

a transmission mode 2, where usage statuses of the third logical channel and the fourth logical channel are inactive, usage statuses of other logical channels associated with the radio bearer are inactive, and the data transmitted through the third logical channel and the data transmitted through the fourth logical channel are the same;

a transmission mode 3, where usage statuses of the first logical channel and the third logical channel are active, usage statuses of other logical channels associated with the radio bearer are inactive, and the data transmitted through the first logical channel and the data transmitted through the third logical channel are duplicated;

a transmission mode 4, where usage statuses of the first logical channel and the third logical channel are active, usage statuses of other logical channels associated with the radio bearer are inactive, and the data transmitted through the first logical channel and the data transmitted through the third logical channel are not duplicated;

a transmission mode 5, where a usage status of the first logical channel or the second logical channel is active, and usage statuses of other logical channels associated with the radio bearer are inactive; and a transmission mode 6, where a usage status of the third logical channel or the fourth logical channel is active, and usage statuses of other logical channels associated with the radio bearer are inactive.

In a possible design, that the M logical channels are sorted based on identifiers IDs of cell groups associated with the M logical channels and IDs of the M logical channels includes: The M logical channels are sorted in ascending or descending order based on IDs of logical channels associated with each cell group, where logical channels associated with a cell group with a larger ID are ranked first, or logical channels associated with a cell group with a smaller ID are ranked first; or the M logical channels are sorted in ascending or descending order based on values respectively corresponding to the M logical channels, where the M logical channels include the first logical channel, and a value corresponding to the first logical channel is obtained based on an ID of a cell group to which the first logical channel belongs, an ID of the first logical channel, and a maximum quantity of logical channels included in the cell groups to which the M logical channels belong.

According to a third aspect, an embodiment of this application provides a data transmission method. The method may be applied to a terminal device, or may be applied to a chip inside a terminal device. For example, the method is applied to the terminal device. In the method, the terminal device receives indication information from a network device, where the indication information includes a bit sequence, values of a plurality of bits in the bit sequence are used to indicate usage statuses of M logical channels associated with a radio bearer, a duplication transmission function is configured for the radio bearer, and m is an integer greater than or equal to 2; and the terminal device determines the usage statuses of the M logical channels based on the indication information, where logical channels of the radio bearer are separately associated with a plurality of cell groups, the plurality of cell groups include a first cell group, the first cell group is configured by the network device, and the M logical channels are associated with the first cell group.

According to the foregoing method, the network device may control, based on the indication information, a usage status of a logical channel configured by the network device, and does not perform cross-network-device control, to avoid complexity caused by the cross-network-device control.

According to a fourth aspect, an embodiment of this application provides an apparatus. The apparatus may be a terminal device, or may be a chip disposed in a terminal device. The apparatus has a function of implementing various possible designs in the first aspect to the third aspect. The function may be implemented by hardware, or may be implemented by hardware executing corresponding software. The hardware or software includes one or more units or modules corresponding to the foregoing functions.

According to a fifth aspect, an embodiment of this application provides an apparatus, including a processor. The processor is configured to execute an instruction stored in a memory, and when the instruction is executed, the apparatus is enabled to perform the method in any possible design of the first aspect to the third aspect.

According to a sixth aspect, an embodiment of this application further provides a computer-readable storage medium, including an instruction. When the instruction is executed, the method in any one of the foregoing aspects or the possible designs of the foregoing aspects is implemented.

According to a seventh aspect, an embodiment of this application further provides a computer program product, including a computer program or an instruction. When the computer program or the instruction is executed, the method in any one of the foregoing aspects or the possible designs of the foregoing aspects is implemented.

BRIEF DESCRIPTION OF DRAWINGS

FIG. 3b-1 and FIG. 3b-2 are schematic diagrams of configuring a plurality of logical channels for a radio bearer;

FIG. 6a-1 and FIG. 6a-2 are example diagrams according to an embodiment of this application;

FIG. 6b-1 and FIG. 6b-2 are another two example diagrams according to an embodiment of this application;

FIG. 7a-1 and FIG. 7a-2 are still another two example diagrams according to an embodiment of this application;

FIG. 7b-1 and FIG. 7b-2 are still another two example diagrams according to an embodiment of this application;

FIG. 9a-1 and FIG. 9a-2 are still another two example diagrams according to an embodiment of this application;

DESCRIPTION OF EMBODIMENTS

Figure 1:
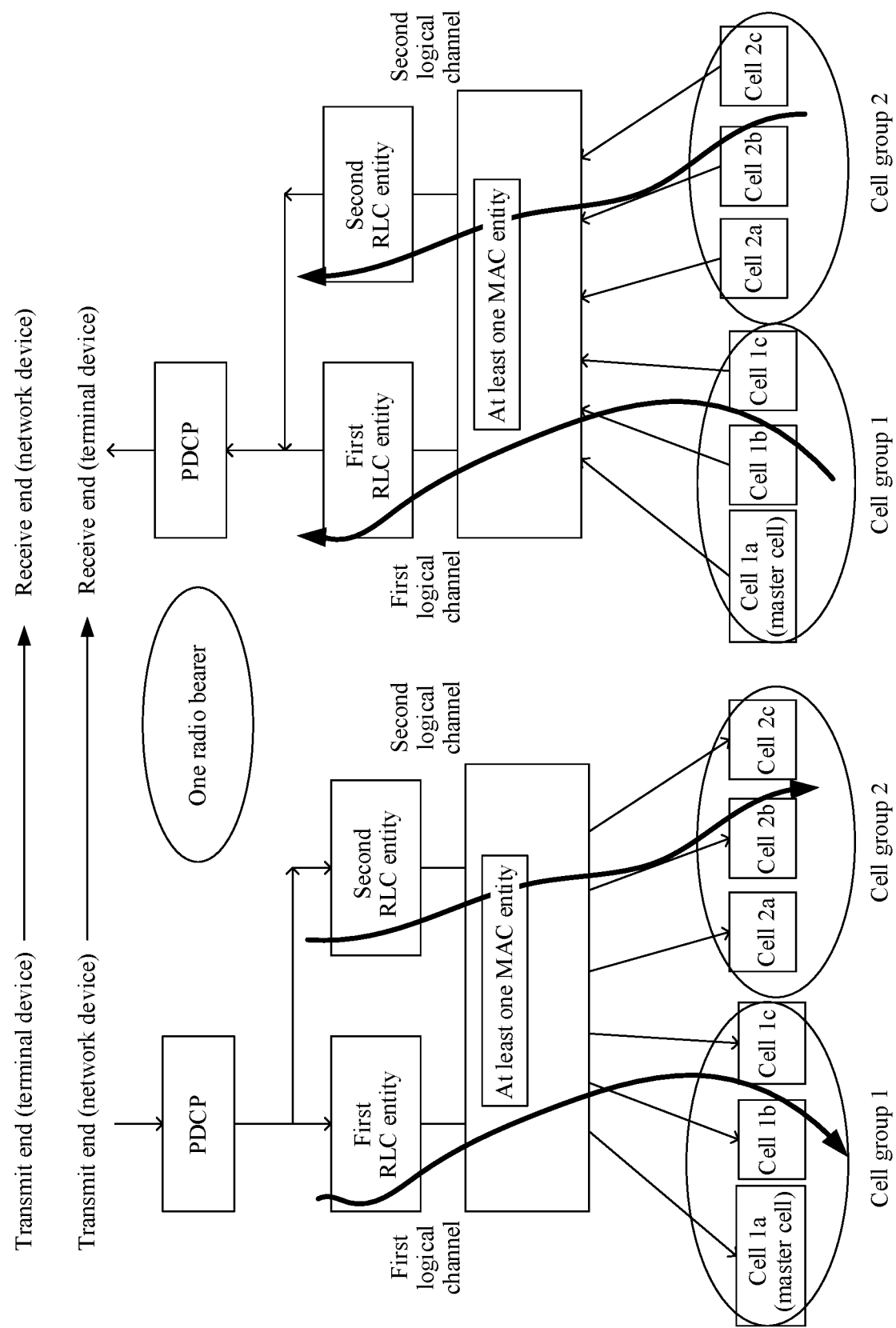
FIG. 1 is an architectural diagram of a wireless communications system to which an embodiment of this application is applicable.

To make the objectives, technical solutions and advantages of the embodiments of this application clearer, the following further describes the embodiments of this application in detail with reference to the accompanying drawings.

In the following, some terms of the embodiments of this application are described, to help a person skilled in the art has a better understanding.

(1) The terminal device is a device having a wireless transceiver function. The terminal device may be deployed on land, indoor or outdoor, or may be hand-held, wearable, or vehicle-mounted; may be deployed on a water surface (for example, on a ship); or may be deployed in air (for example, on an airplane, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. The terminal device may also be sometimes referred to as user equipment (UE), a mobile station, a remote station, or the like. A specific technology, a device form, and a name used by the terminal device are not limited in the embodiments of this application.

(2) A network device includes, for example, an access network (AN) device. The access network device, for example, a base station, may be a device that communicates with a wireless terminal device over an air interface in an access network by using one or more cells. The network device may be configured to mutually convert a received over-the-air frame and an internet protocol (IP) packet and serve as a router between the wireless terminal and a rest portion of the access network, where the rest portion of the access network may include an IP network. The network device may coordinate attribute management of the air interface. For example, the network device may include an evolved NodeB (eNB, or e-NodeB) in a long term evolution (LTE) system or an LTE advanced (LTE-A) system, or may include a next generation NodeB (gNB) in a $5^{th}$ generation mobile communications technology (5G) new radio (NR) system, or may include a centralized unit (CU) and a distributed unit (DU) in a cloud radio access network (CloudRAN) system. This is not limited in the embodiments of this application.

(3) DC: The terminal device is connected to two base stations at the same time. The two base stations connected to the terminal device may be base stations in a same radio access technology. For example, both are base stations in an LTE communications system or both are base stations in a 5G communications system. Alternatively, the two base stations connected to the terminal device may be base stations in different radio access technologies. For example, one is a base station in an LTE communications system, and the other is a base station in a 5G communications system.

(4) CA: In a CA technology, a plurality of component carriers (CC) may be aggregated to provide a service for one terminal device, to implement larger transmission bandwidth and effectively improve uplink and downlink transmission rates.

(5) A logical channel is associated with a cell, or in other words, the logical channel is associated with a carrier, which includes but is not limited to: if configuration of the logical channel indicates that some cells are allowed to use the logical channel, it indicates that the data transmitted through the logical channel can be transmitted on these cells, or resources on these cells may be allocated to the logical channel. In this case, it may be referred to as that the logical channel is associated with these cells. Further, the data transmitted through the logical channel is not transmitted on a cell other than the cell associated with the logical channel. A logical channel corresponding to a data packet duplicated at the PDCP layer may be associated with a cell. In some scenarios, if no cell association relationship is configured, it indicates that the data transmitted through the logical channel can be transmitted on any cell.

For example, a parameter, for example, referred to as a parameter A, may be configured for the logical channel, and different cells are indicated by using values of the parameter A, indicating that the data transmitted through the logical channel can be transmitted only on a cell specified by the parameter A. For example, if the parameter A is configured for a logical channel 1, and the parameter A indicates a cell 1 and a cell 2, it indicates that data on the logical channel can be transmitted only on the cell 1 and the cell 2 that are indicated by the parameter A. In this way, the logical channel 1, the cell 1, and the cell 2 may be referred to as having an association relationship, or may be referred to as a binding relationship or a mapping relationship.

(6) Radio bearer: At least one radio bearer (RB) is established between the terminal device and the network device to transmit data. The radio bearer may be classified into a signaling radio bearer (SRB) used for transmitting signaling data and a data radio bearer (DRB) used for transmitting service data. A set of functional entities of a same radio bearer includes one PDCP entity, at least two RLC entities corresponding to the PDCP entity, at least one MAC entity corresponding to the at least two RLC entities, and at least one physical (PHY) layer entity corresponding to the at least one MAC entity.

(7) The terms "system" and "network" may be used interchangeably in the embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first logical channel and a second logical channel are merely intended to distinguish between different logical channels, and do not indicate that the two logical channels have different priorities, importance, or the like.

The foregoing describes some concepts in the embodiments of this application. The following describes technical features in the embodiments of this application.

Duplication transmission at a PDCP layer usually means that a data packet of a radio bearer is duplicated at the PDCP layer into a plurality of same packets (namely, duplicate packets), and then the two data packets are separately delivered to a plurality of different RLC entities for transmission, and are further transmitted to a MAC layer through different logical channels. The logical channel is a channel between an RLC layer and the MAC layer. It should be noted that performing transmission again that is commonly mentioned refers to retransmission, but duplication transmission in the embodiments of this application is not retransmission. Retransmission refers to transmitting a same data packet again after a transmitting failure, or transmitting a same data packet for a plurality of consecutive times. Duplication transmission means that one data packet is duplicated to obtain two data packets, and the two data packets are separately transmitted on two logical channels. Herein, "duplication" may also be understood as "duplicated".

In an architectural diagram of a wireless communications system shown in FIG. 1, for a radio bearer between a transmit end and a receive end, because a same PDCP entity at the transmit end corresponds to at least two RLC entities, each RLC entity corresponds to one logical channel for transmitting data. Correspondingly, a same PDCP entity at the receive end corresponds to at least two RLC entities, and each RLC entity corresponds to one logical channel for receiving data. Therefore, the radio bearer between the transmit end and the receive end includes at least two logical channels. The transmit end may be a terminal device, and the receive end may be a network device. Alternatively, the receive end may be a terminal device, and the transmit end may be a network device.

The transmit end and the receive end shown in FIG. 1 respectively include a same PDCP entity, a first RLC entity corresponding to the same PDCP entity, and a second RLC entity corresponding to the same PDCP entity. The first RLC entity corresponds to a first logical channel, and the second RLC entity corresponds to a second logical channel. The transmit end transmits data on the first logical channel to the receive end in a cell 1b or a cell group 1 corresponding to the first logical channel, and the receive end receives, in the cell 1b or the cell group 1 corresponding to the first logical channel, the data that is sent by the transmit end and that is on the first logical channel. The transmit end transmits data on the second logical channel to the receive end in a cell 2b or a cell group 2 corresponding to the second logical channel, and the receive end receives the data on the second logical channel in the cell 2b or the cell group 2 corresponding to the second logical channel. In a duplication mode, duplication transmission is performed on data from the same PDCP entity on the second RLC entity of the transmit end and the first RLC entity of the transmit end, so as to improve data transmitting reliability of the transmit end. It should be noted that, in FIG. 1, that the transmit end and the receive end separately correspond to two cell groups is used as an example. In another possible case, the transmit end and the receive end each may separately correspond to one cell group. This is not specifically limited.

The following describes how to implement a transmission function at the PDCP layer in a DC scenario and a CA scenario.

Figure 2A:
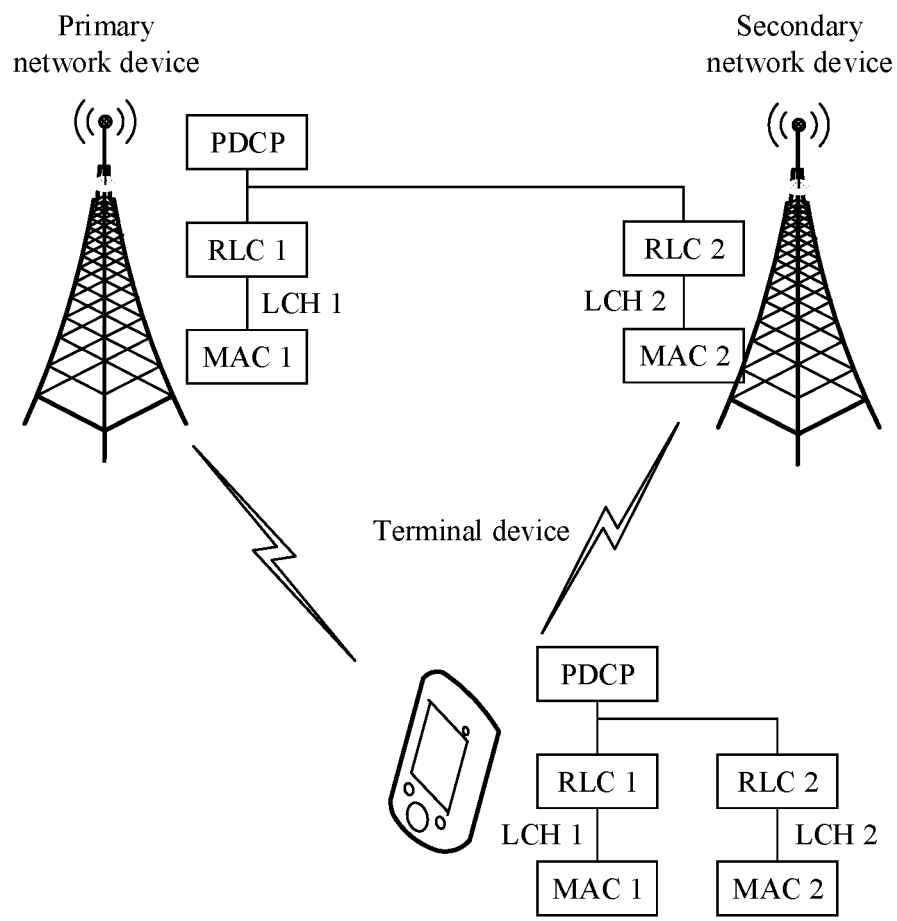
FIG. 2a is a network architecture used to implement a duplication transmission function at a PDCP layer in a DC scenario.

FIG. 2a shows an example of a network architecture used to implement a duplication transmission function at the PDCP layer in the DC scenario. For a network device, the DC scenario involves a primary network device and a secondary network device. For the radio bearer, the primary network device includes one PDCP entity, one RLC entity, and one MAC entity. For the radio bearer, the secondary network device includes one RLC entity and one MAC entity. For a terminal device, the terminal device includes one PDCP entity, two RLC entities, and two MAC entities for the radio bearer. The PDCP entity and the PDCP layer may be understood as a same concept. Similarly, the RLC entity and an RLC layer may be understood as a same concept, and the MAC entity and a MAC layer may be understood as a same concept. For one DRB, the primary network device may further have a service data adaptation protocol (SDAP) entity above the PDCP entity, and the terminal device may further have an SDAP entity above the PDCP entity.

In the DC scenario, one terminal device is connected to two network devices at the same time, namely, the primary network device and the secondary network device. If the duplication transmission function at the PDCP layer is configured for a radio bearer, two data packets obtained through duplication at the PDCP layer are transmitted to two different RLC entities, the data packets are transmitted to different MAC entities through different logical channels, and finally two MAC PDUs are formed and transmitted on different carriers. This process is the same for the network device and the terminal device. A difference lies in that, for the network device, the PDCP layer in the primary network device transmits two duplicated data packets to two different RLC entities, and the two RLC entities are respectively located in the primary network device and the secondary network device. Then, the RLC entity in the primary network device transmits the received data packets to the MAC entity in the primary network device, and the RLC entity in the secondary network device transmits the received data packets to the MAC entity in the secondary network device. The two MAC entities transmit the data packets by using respective carriers. For the terminal device, the two RLC entities and the two MAC entities are both located in the terminal device. Other processes are the same.

For example, in the DC scenario, the transmit end and the receive end may separately correspond to two cell groups. When the network device serves as the transmit end, two cell groups corresponding to the network device are a master cell group (MCG) and a secondary cell group (SCG). The master cell group is configured by the primary network device, and the secondary cell group is configured by the secondary network device.

Figure 2B:
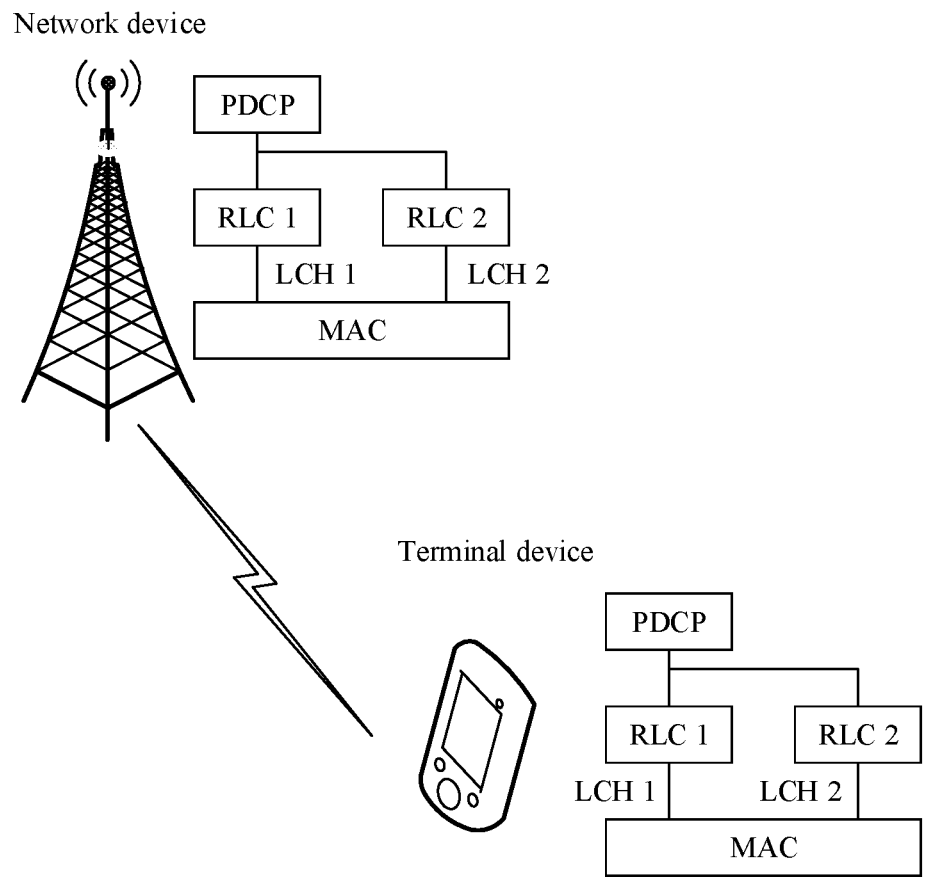
FIG. 2b is a network architecture used to implement a duplication transmission function at a PDCP layer in a CA scenario.

FIG. 2b is a network architecture used to implement a duplication transmission function at the PDCP layer in the CA scenario. In the CA scenario, the terminal device is connected to one network device. Network architectures of the network device and the terminal device for one radio bearer are both shown in FIG. 2b. In other words, for the radio bearer, the network device and the terminal device include one PDCP entity, two RLC entities, and one MAC entity. For example, in the CA scenario, a transmit end and a receive end may separately correspond to one cell group.

In the CA scenario, one terminal device is connected to one network device, and a same network device has more than one carrier to serve the terminal device. Assuming that the duplication transmission function at the PDCP layer is configured for a radio bearer, two data packets obtained through duplication at the PDCP layer are to be transmitted to two different RLC entities. The two RLC entities transmit the two data packets to a same MAC entity through different logical channels. In this case, because the two data packets are transmitted to the same MAC entity, the MAC entity places the two data packets in one MAC PDU for transmission. Therefore, to enable the two data packets to be transmitted by using the two MAC PDUs, a parameter, for example, a parameter A, may be configured for a logical channel. Values of the parameter A are used to indicate different cells, to ensure that the two data packets can finally form two MAC PDUs to be transmitted on different cells.

For example, if a parameter A is configured for a logical channel, it indicates that data in an RLC entity corresponding to the logical channel can be transmitted only on a cell indicated by the parameter A. In this way, if parameters A configured for two duplicate logical channels indicate different cells, the two duplicate data packets are finally transmitted on the different cells, so that reliability can be ensured.

In a communications system, after the duplication transmission function at the PDCP layer is configured for the radio bearer, the duplication transmission function that is configured for the radio bearer and that is at the PDCP layer may be activated or deactivated. Specifically, in the DC scenario, when a DC split bearer is configured for a radio bearer, the terminal device may separately transmit different data packets to the primary network device and the secondary network device through two logical channels on a terminal device side. After the duplication transmission function that is configured for a radio bearer and that is at the PDCP layer is activated, the PDCP layer duplicates a data packet and transmits the data packet through two logical channels. After the duplication transmission function that is configured for a radio bearer and that is at the PDCP layer is deactivated, the operation is rolled back to the DC split bearer operation.

Figure 3A:
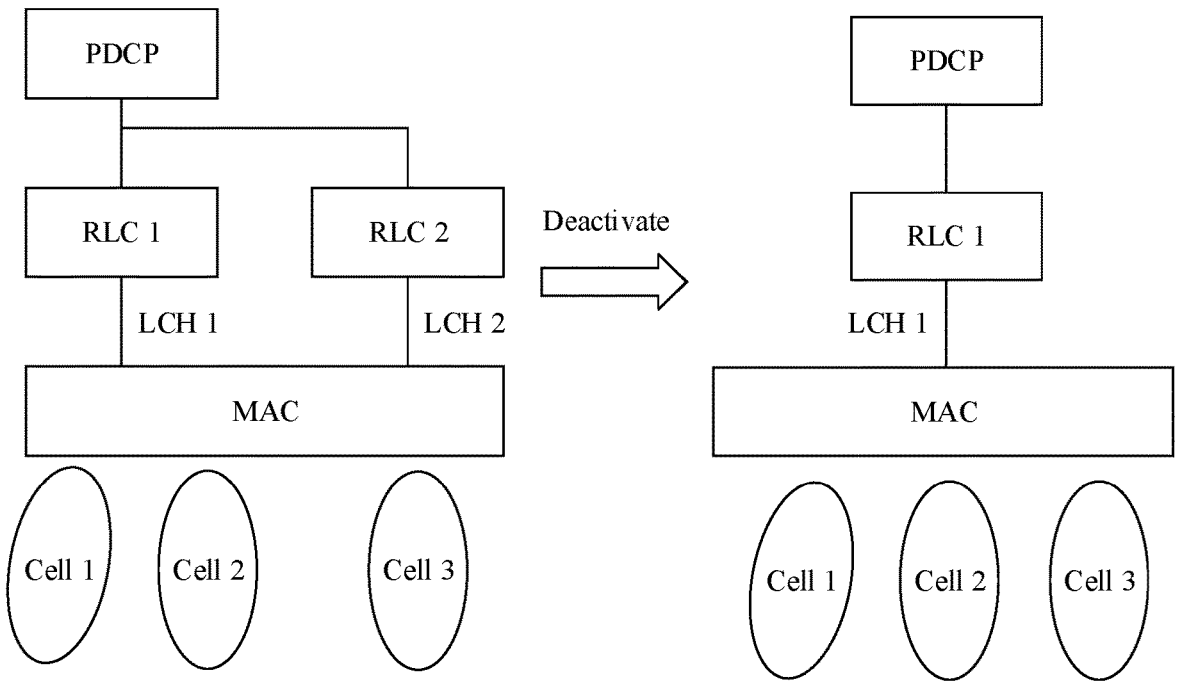
FIG. 3a is a schematic diagram of activating and deactivating a duplication transmission function in a CA scenario.

In the CA scenario, after the duplication transmission function that is configured for a radio bearer and that is at the PDCP layer is deactivated (or referred to as that duplication at the PDCP layer is deactivated, or referred to as that the duplication transmission function of the radio bearer is deactivated), an association relationship between a logical channel and a cell in the radio bearer is no longer applicable. Currently, the duplication at the PDCP layer is limited to that one radio bearer transmits, through two logical channels, a data packet that is duplicated at the PDCP layer (also referred to as duplication transmission of two legs). Further, one of the two legs may be configured as a primary leg. For example, a leg in which a logical channel 1 is located is a primary leg, and a logical channel in the primary leg in the embodiments of this application may be referred to as the primary logical channel. Referring to FIG. 3a, it is assumed that when the duplication transmission function at the PDCP layer is activated (or referred to as that the duplication at the PDCP layer is activated), data from a logical channel 1 can be transmitted only in a cell 1 or a cell 2 (the logical channel 1 is associated with the cell 1 and the cell 2), and data from a logical channel 2 can only be transmitted on a cell 3 (the logical channel 2 is associated with the cell 3). At a moment, the duplication transmission function at the PDCP layer is deactivated, and only a primary logical channel 1 is still working. In this case, to improve a transmission capacity, a cell binding relationship configured for the logical channel 1 is no longer applicable. In other words, the logical channel 1 is allowed to use all available cells of the terminal device. That the logical channel uses a cell herein may mean that data transmitted through the logical channel may be transmitted in the cell.

Figure 4A:
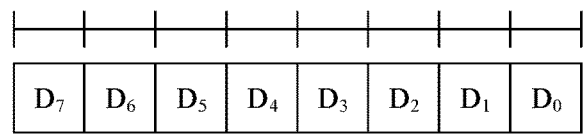
FIG. 4a is a schematic diagram of a format of a payload of a MAC CE.

Currently, when the network device configures the duplication transmission function at the PDCP layer for a data radio bearer by using radio resource control (RRC) signaling, an initial state of the duplication transmission function that is of the data radio bearer and that is at the PDCP layer may be indicated as activated or deactivated. Further, the network device may further configure activation/deactivation of the duplication transmission function at the PDCP layer of the data radio bearer by using a MAC control element (CE). FIG. 4a shows a format of a payload of a MAC CE. The MAC CE has a fixed size and includes eight fields. After a MAC entity receives the MAC CE, Di in the MAC CE indicates activation/deactivation of a duplication transmission function at a PDCP layer of an $i^{th}$ DRB after the duplication transmission function at the PDCP is configured, an RLC entity is associated with DRBs of the current MAC entity, and the DRBs are sorted in ascending order based on IDs of the DRBs. Di=a indicates that the duplication transmission function at the PDCP layer of the DRB is activated, and Di=1 indicates that the duplication transmission function at the PDCP layer of the DRB is deactivated.

Figures 1, 2, 3B:
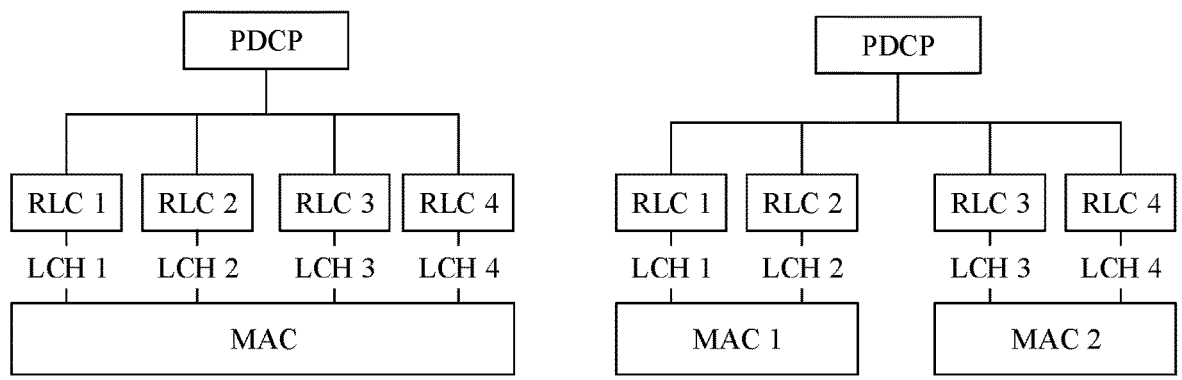

However, the communications system may subsequently introduce duplication at PDCP layers of a plurality of logical channels. To be specific, a radio bearer transmits, through the plurality of logical channels, a data packet duplicated at the PDCP layer, for example, may transmit, through three or four logical channels, the data packet duplicated at the PDCP layer. FIG. 3b-1 shows that three logical channels are configured in the CA scenario, and FIG. 3b-2 shows that four logical channels are configured in a DC+CA scenario. In this case, how to transmit data through a logical channel needs to be further studied.

Based on this, the embodiments of this application provide a data transmission method, to allow, when a plurality of logical channels are configured for a radio bearer, a terminal device to transmit data through at least one logical channel associated with the radio bearer based on an indication of a network device.

The data transmission method provided in the embodiments of this application may include two possible solutions: a solution 1 and a solution 2.

In the solution 1, M logical channels associated with the radio bearer may be sorted based on IDs of cell groups associated with the M logical channels and IDs of the M logical channels, and a usage status of an $i^{th}$ logical channel in the M logical channels is indicated by using an $i^{th}$ bit in a bit sequence included in indication information, so that the terminal device can transmit data based on the indication information through the at least one logical channel associated with the radio bearer.

In the solution 2, values of a plurality of bits in a bit sequence included in indication information is used to indicate a transmission mode of the radio bearer, and each transmission mode of the radio bearer may include usage statuses of M logical channels associated with the radio bearer, so that the terminal device can transmit data based on the indication information through the at least one logical channel associated with the radio bearer, and a quantity of bits in the bit sequence may be less than M. In other words, a relatively small quantity of bits may be used to indicate the usage statuses of the M logical channels, to effectively reduce resource overheads.

In this embodiment of this application, the radio bearer may be a DRB, or may be an SRB, or may include a DRB and an SRB. That the radio bearer transmits data through a logical channel means that the radio bearer or an associated PDCP entity uses an RLC entity associated with the logical channel and the logical channel to process and transmit data. In other words, legs associated with the logical channel are used to transmit data.

Embodiment 1

Figure 5:
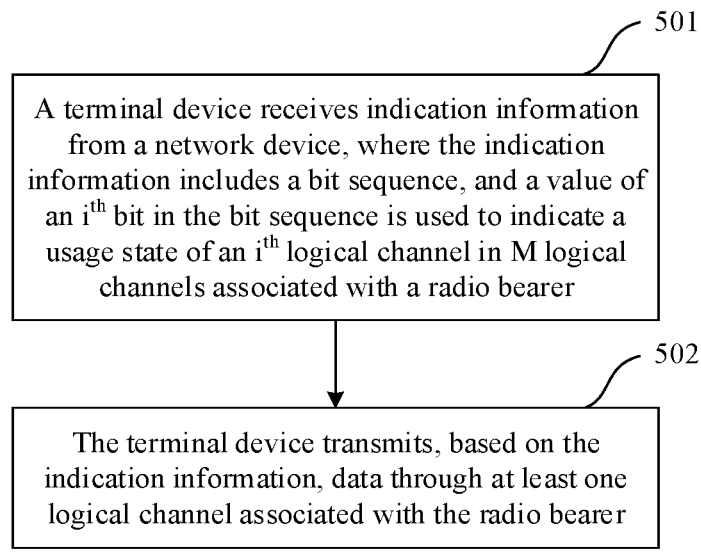
FIG. 5 is a schematic flowchart corresponding to a data transmission method according to an embodiment of this application.

Based on the solution 1, FIG. 5 is a schematic flowchart corresponding to a data transmission method according to an embodiment of this application. As shown in FIG. 5, the method includes the following steps.

Step 501: A terminal device receives indication information from a network device, where the indication information includes a bit sequence, a value of an $i^{th}$ bit in the bit sequence is used to indicate a usage status of an $i^{th}$ logical channel in M logical channels associated with a radio bearer, a duplication transmission function is configured for the radio bearer, i=1, 2, ..., or M, and M may be an integer greater than or equal to 2. A logical channel associated with the radio bearer in the embodiments of this application may also be referred to as a logical channel of the radio bearer or a logical channel in the radio bearer, and both express a same meaning.

Step 502: The terminal device transmits, based on the indication information, data through at least one logical channel associated with the radio bearer.

In this embodiment of this application, a quantity of bits in the bit sequence is N, and N is greater than or equal to M. If N is greater than M, in an example, the terminal device may ignore an $(M+1)^{th}$ bit to an $N^{th}$ bit in the bit sequence. In other words, the terminal device ignores last N-M bits in the bit sequence. In another example, the terminal may alternatively ignore first N-M bits in the bit sequence. In this case, the $i^{th}$ bit in the bit sequence may be understood as an $i^{th}$ bit in the bit sequence other than the first N-M bits.

In this embodiment of this application, the usage status of the $i^{th}$ logical channel may be active or inactive. If the usage status of the $i^{th}$ logical channel is active, the $i^{th}$ logical channel is allowed to be used for duplication data transmission. Alternatively, if the usage status of the $i^{th}$ logical channel is inactive, the $i^{th}$ logical channel is prohibited from being used for duplication data transmission. That the $i^{th}$ logical channel is prohibited from being used for duplication data transmission may be understood as: The $i^{th}$ logical channel is prohibited from being used to transmit data, or the $i^{th}$ logical channel may be used for transmitting non-duplication data, but cannot be used for transmitting duplication data. The value of the $i^{th}$ bit is used to indicate the usage status of the $i^{th}$ logical channel in the M logical channels associated with the radio bearer. For example, if the value of the $i^{th}$ bit is 0, it indicates that the $i^{th}$ logical channel is inactive, if the value of the $i^{th}$ bit is 1, it indicates that the $i^{th}$ logical channel is active.

In this embodiment of this application, the M logical channels may be sorted based on identifiers IDs of cell groups associated with the M logical channels and IDs of the M logical channels. There are a plurality of specific implementations.

In a possible implementation, the M logical channels are sorted in ascending or descending order based on IDs of logical channels associated with each cell group. Logical channels associated with a cell group with a larger ID are ranked first, and logical channels associated with a cell group with a smaller ID are ranked last. Alternatively, logical channels associated with a cell group with a smaller ID are ranked first, and logical channels associated with a cell group with a larger ID are ranked last. In other words, logical channels belonging to a same cell group are first sorted in ascending order/descending order based on IDs of the logical channels, and then a plurality of groups of sorted logical channels are sorted in ascending order/descending order based on IDs of the cell groups. When the M logical channels are associated with one cell group, the M logical channels are sorted in ascending order or descending order based on the IDs of the logical channels.

The following uses an example for description: The M logical channels include an LCH 1, an LCH 2, an LCH 3, and an LCH 4, the LCH 1 and the LCH 3 are associated with a cell group 1, and the LCH 2 and the LCH 4 are associated with a cell group 2. The LCH 1 may be understood as a logical channel whose ID is "1", and the LCH 1 may be understood as a logical channel whose ID is "2". This is the same for the LCH 3 and the LCH 4. The cell group 1 may be understood as a cell group whose ID is "1", and the cell group 2 may be understood as a cell group whose ID is "2". Certainly, the ID of the cell group 1 may also be "0", and the ID of the cell group 2 may also be "1".

For example, the logical channels associated with the cell group 1 are sorted in ascending order, to obtain the LCH 1 and the LCH 3. The logical channels associated with the cell group 2 are sorted in ascending order, to obtain the LCH 2 and the LCH 4. Then, the logical channels are sorted in ascending order based on the IDs of the cell groups. In this case, it may be obtained that the M logical channels are the LCH 1, the LCH 3, the LCH 2 and the LCH 4.

For another example, the logical channels associated with the cell group 1 are sorted in descending order, to obtain the LCH 3 and the LCH 1. The logical channels associated with the cell group 2 are sorted in descending order, to obtain the LCH 4 and the LCH 2. Then, the logical channels are sorted in ascending order based on the IDs of the cell groups. In this case, it may be obtained that the M logical channels are the LCH 3, the LCH 1, the LCH 4, and the LCH 2.

In still another possible implementation, the M logical channels are sorted in ascending order or descending order based on values respectively corresponding to the M logical channels. A value corresponding to the $i^{th}$ logical channel is obtained based on an ID of a cell group associated with the $i^{th}$ logical channel, an ID of the $i^{th}$ logical channel, and a maximum quantity of logical channels included in the cell group associated with the $i^{th}$ logical channel. For example, the value corresponding to the $i^{th}$ logical channel=cell group ID*maxLCH+LCH ID. The cell group ID is the ID of the cell group associated with the $i^{th}$ logical channel, the LCH ID is the ID of the $i^{th}$ logical channel, and the maxLCH is the maximum quantity of logical channels included in the cell group associated with the $i^{th}$ logical channel. When the M logical channels are associated with one cell group, a value corresponding to each logical channel may be an ID of the logical channel.

The following uses an example for description: The M logical channels include the LCH 1, the LCH 2, and the LCH 3, and the LCH 1 and the LCH 3 are associated with the cell group 1, and the LCH 2 is associated with the cell group 2. The cell group 1 and the cell group 2 include a maximum of 32 logical channels. The ID of the cell group 1 is "0", and the ID of the cell group 2 is "1". Therefore, it is obtained through calculation that: A value corresponding to the LCH 1=0*32+1=1, a value corresponding to the LCH 2=1*32+2=34, and a value corresponding to the LCH 3=0*32+3=3. In this way, if the M logical channels are sorted in ascending order based on the values respectively corresponding to the M logical channels, it may be obtained that the M logical channels are the LCH 1, the LCH 3, and the LCH 2. If the M logical channels are sorted in descending order based on the values respectively corresponding to the M logical channels, it may be obtained that the M logical channels are the LCH 2, the LCH 3, and the LCH 1.

It should be noted that: (1) In the foregoing examples, an example in which the M logical channels are associated with two cell groups is used for description. If the M logical channels are associated with one or more than two cell groups, the foregoing manner may also be applicable, and details are not described again. (2) In another possible embodiment, there may be another implementation of sorting based on the identifiers IDs of the cell groups associated with the M logical channels and the IDs of the M logical channels. This is not limited in this application.

In this embodiment of this application, a quantity of logical channels associated with the radio bearer may be equal to M, or may be greater than M. For the two cases, the following separately describes specific implementation of transmitting, by the terminal device based on the indication information, data through the at least one logical channel associated with the radio bearer.

Case 1: The quantity of logical channels associated with the radio bearer is equal to M. In other words, the logical channels associated with the radio bearer are the M logical channels.

In a possible implementation, the terminal device may transmit data based on the usage statuses of the M logical channels through a logical channel that is in the M logical channels and whose usage status is active. In other words, if the indication information indicates that a logical channel in the M logical channels is active, the terminal device may transmit data through the logical channel. If the indication information indicates that a logical channel in the M logical channels is inactive, the terminal device does not transmit data through the logical channel.

In an example, if M bits indicate that usage statuses of K1 logical channels in the M logical channels are active, and $0<K1 \leq P$, the terminal device transmits data through the K1 logical channels. When K1>1, the data transmitted through the K1 logical channels is duplicated. In other words, the radio bearer performs duplication data transmission through the K1 logical channels. P is a maximum quantity of logical channels that are in the logical channels associated with the radio bearer and that are active. A value of P may be predefined, or may be configured by the network device. For example, the value of P may be configured by the network device by using RRC signaling or a system information block (SIB), or may be indicated by the terminal device by receiving the indication information from the network device. To be specific, in addition to the bit sequence, the indication information received by the terminal device from the network device may further include a field used to indicate the value of P. For example, the network device may configure one P value for each radio bearer between the network device and the terminal device. In other words, one P value is dedicated to each radio bearer. In this case, a maximum quantity of logical channels that are in each radio bearer and that are in active may be different. Alternatively, the network device may configure one P value for the terminal device. In this case, a maximum quantity of logical channels that are in each radio bearer between the network device and the terminal device and that are in active is the same. Alternatively, if the indication information sent by the network device includes the P value for the radio bearer, the maximum quantity that is of logical channels and that is indicated by the network device each time may be the same or different, and the logical channels belong to the radio bearer and are in active. For example, M=3 and P=2. When K1=1, there is one logical channel in active, for example, a logical channel 1. In this case, the terminal device may transmit data through the logical channel 1. When K1=2, there are two logical channels in active, for example, a logical channel 1 and a logical channel 2. In this case, the terminal device may transmit data through the logical channel 1 and the logical channel 2.

In other words, when $0<K1 \leq P$, the terminal device may directly transmit data through a logical channel that is indicated by the indication information and that is active. If a value of K1 does not fall within the foregoing range, the terminal device may no longer directly transmit data through the logical channel that is indicated by the indication information and that is active.

This embodiment of this application further provides an implementation of the terminal device when the value of K1 does not fall within the foregoing range, namely, an implementation when K1=0 or K1>P. The following provides detailed descriptions.

(1) When K1=0, it is indicated that the M bits indicate that the usage statuses of the M logical channels are all inactive.

When the M logical channels are all associated with a first cell group (which may be understood as the CA scenario described above), the terminal device may consider that the duplication transmission function of the radio bearer is deactivated, and may further select one logical channel from the M logical channels to transmit data. For example, the terminal device randomly selects a logical channel or selects a default logical channel to transmit data. The default logical channel may be a logical channel with a smallest or largest ID in the M logical channels. This is not specifically limited. In another possible embodiment, the terminal device may alternatively ignore the indication information or ignore the bit sequence.

When a first part of logical channels in the M logical channels are associated with the first cell group and a second part of logical channels in the M logical channels are associated with a second cell group (which may be understood as the DC scenario described above), the terminal device may perform any one of the following: (1) The terminal device rolls back a split bearer operation, in other words, selects a logical channel (for example, the logical channel 1) from the first cell group, selects a logical channel (for example, the logical channel 2) from the second cell group, and transmits data through the logical channel 1 and the logical channel 2. The data transmitted through the logical channel 1 and the data transmitted through the logical channel 2 are not duplicated. In an example, the logical channel 1 may be a logical channel that is in the first cell group and whose logical channel ID is the largest or the smallest, or any logical channel in the first cell group. The logical channel 2 may be a logical channel that is in the second cell group and whose logical channel ID is the largest or smallest, or any logical channel in the second cell group. In another example, the network device may preconfigure, by using the RRC signaling, a logical channel used by the network device in the first cell group and the second cell group when the network device rolls back to the split bearer operation. In other words, the network device configures, by using the RRC signaling, which logical channel is used as the logical channel 1 and which logical channel is used as the logical channel 2. Optionally, when an amount of to-be-transmitted data of the radio bearer is less than a threshold configured by one network device, the terminal device may transmit data through the logical channel 1 or the logical channel 2, or the network device indicates, by using the RRC signaling, a logical channel used by the terminal device to transmit data. Optionally, when the amount of to-be-transmitted data of the radio bearer is less than the threshold configured by one network device, the terminal device may alternatively transmit data through any logical channel in a cell group indicated by the network device by using the RRC signaling, or a logical channel whose ID is the largest or the smallest. (2) The terminal device may consider that the duplication transmission function of the radio bearer is deactivated, and then may select one logical channel from the M logical channels to transmit data. For example, the terminal device randomly selects one logical channel. This is not specifically limited. In another possible embodiment, the terminal device may alternatively ignore the indication information or ignore the bit sequence.

(2) When K1>P, the M bits indicate that a quantity of logical channels that are in the M logical channels and that are in active is greater than P. In this case, the terminal device may consider that the duplication transmission function of the radio bearer is activated, and further select P logical channels from the K1 logical channels to transmit data. The data transmitted through the P logical channels is duplicated. In other words, the radio bearer performs duplication data transmission through the P logical channels. In an example, the terminal device may randomly select the P logical channels from the K1 logical channels, or the terminal device may select the P logical channels corresponding to a physical layer transmission resource with relatively good channel quality from the K1 logical channels, or the terminal device may select, from the K1 logical channels, the P logical channels whose corresponding values are the largest or the smallest. In another possible embodiment, the terminal device may alternatively ignore the indication information or ignore the bit sequence. The channel quality of the physical layer transmission resource may be a maximum value or an average value of reference signal received power (RSRP)/reference signal received quality (RSRQ)/a signal to interference plus noise ratio (SINR) measured in a cell that corresponds to the logical channel and that is allowed to be used. This is not specifically limited.

For example, as shown in FIG. 6a-1, the network device configures four logical channels for a radio bearer 1. When indication information sent by the network device includes a bit sequence for the radio bearer 1, four bits in the bit sequence from front to back respectively correspond to usage statuses of the four logical channels the LCH 1 to the LCH 4. When the first bit and the fourth bit are set to 1, it indicates that the LCH 1 and the LCH 4 may be used for duplication data transmission. As shown in FIG. 6a-2, the network device configures three logical channels for a radio bearer 2. When the indication information sent by the network device includes a bit sequence for the radio bearer 2, the bit sequence may include three bits that respectively indicate usage statuses of the three logical channels, when the first bit and the third bit are set to 1, it indicates that the LCH 1 and the LCH 3 may be used for duplication data transmission. In another possible example, the network device may alternatively use the bit sequence including four bits. When three logical channels are configured for the radio bearer, first three bits in the bit sequence may respectively indicate usage statuses of the three logical channels, a terminal may not parse the last bit or ignore the last bit. Alternatively, last three bits in the bit sequence may respectively indicate usage statuses of the three logical channels, and the terminal may not parse the first bit or ignore the first bit.

For another example, as shown in FIG. 6b-1, the network device configures four logical channels for the radio bearer 1. When the first bit and the fourth bit are set to 1, it indicates that the LCH 1 and the LCH 4 may be used for duplication data transmission. As shown in FIG. 6b-2, the network device configures three logical channels for the radio bearer 2. When the first bit and the third bit are set to 1, it indicates that the LCH 1 and the LCH 3 may be used for duplication data transmission.

It should be noted that the solutions in the three cases (namely, 0<K1≤P, K1=0, and K1>P) described in the foregoing examples may be separately implemented, or may be implemented in combination. This is not limited in this embodiment of this application.

Case 2: The quantity of logical channels associated with the radio bearer is greater than M. For example, the quantity of logical channels associated with the radio bearer is equal to M+1. In other words, in addition to the M logical channels, the logical channels associated with the radio bearer may further include one primary logical channel. Further, the primary logical channel may be always in active, and the network device does not need to indicate the usage status of the primary logical channel.

In a possible implementation, the terminal device may transmit, based on the usage statuses of the M logical channels, data through a logical channel that is in the M logical channels and whose usage status is active and a primary logical channel.

In an example, if M bits indicate that usage statuses of the K2 logical channels in the M logical channels are active, and 0<K2<P−1, the terminal device transmits data through the K2 logical channels. When K2 is greater than 1, the data transmitted through the K2 logical channels is duplicated, and P is a maximum quantity of logical channels that are in the logical channels associated with the radio bearer and that are active. For example, M=3, and P=2. When K2=1, in other words, there is one logical channel in active in the M logical channels, for example, the logical channel 1, the terminal device may transmit data through the logical channel 1 and the primary logical channel. The data transmitted through the logical channel 1 and the data transmitted through the primary logical channel are duplicated. In other words, the terminal device performs duplication data transmission through the logical channel 1 and the primary logical channel.

In other words, when 0<K2≤P−1, the terminal device may directly transmit data through a logical channel that is indicated by the indication information and that is active and the primary logical channel. If a value of K2 does not fall within the foregoing range, the terminal device may no longer directly transmit data through the logical channel that is indicated by the indication information and that is active.

This embodiment of this application further provides an implementation of the terminal device when the value of K2 does not fall within the foregoing range, namely, an implementation when K2=0 or K2>P−1. The following provides detailed descriptions.

(1) When K2=0, it is indicated that the M bits indicate that the usage statuses of the M logical channels are all inactive.

When the M logical channels are all associated with the first cell group (which may be understood as the CA scenario described above), the terminal device may consider that the duplication transmission function of the radio bearer is deactivated, and the terminal device may transmit data through the primary logical channel. In another possible embodiment, the terminal device may alternatively ignore the indication information or ignore the bit sequence.

When a first part of logical channels in the M logical channels are associated with the first cell group and a second part of logical channels in the M logical channels are associated with a second cell group (which may be understood as the DC scenario described above), and the primary logical channel belongs to the first cell group, the terminal device may perform any one of the following: (1) The terminal device rolls back a split bearer operation, in other words, selects a logical channel (for example, the logical channel 1) from the first cell group, selects a logical channel (for example, the logical channel 2) from the second cell group, and transmits data through the logical channel 1 and the logical channel 2. The data transmitted through the logical channel 1 and the data transmitted through the logical channel 2 are not duplicated. In an example, the logical channel 1 may be the primary logical channel or a logical channel that is in the first cell group and whose logical channel ID is the largest or the smallest, or any logical channel in the first cell group. The logical channel 2 may be a logical channel that is in the second cell group and whose logical channel ID is the largest or smallest, or any logical channel in the second cell group. In another example, the network device may preconfigure, by using the RRC signaling, a logical channel used in the first cell group and/or the second cell group when the network device rolls back to the split bearer operation. When the network device configures, by using the RRC signaling, only the logical channel used in the second cell group, the primary logical channel is used in the first cell group by default. Optionally, when an amount of to-be-transmitted data of the radio bearer is less than a threshold configured by one network device, the terminal device may transmit data through the logical channel 1 or the logical channel 2, or the network device indicates, by using the RRC signaling, a logical channel used by the terminal device to transmit data. Optionally, when the amount of to-be-transmitted data of the radio bearer is less than the threshold configured by one network device, the terminal device may alternatively transmit data through any logical channel in a cell group indicated by the network device by using the RRC signaling, or a logical channel whose ID is the largest or the smallest. (2) The terminal device may consider that the duplication transmission function of the radio bearer is deactivated, and then may transmit data through the primary logical channel. In another possible embodiment, the network device may configure, by using the RRC signaling, the terminal to perform (1) or (2).

(2) When K2>P, the M bits indicate that a quantity of logical channels that are in the M logical channels and that are in active is greater than P−1. In this case, the terminal device may consider that the duplication transmission function of the radio bearer is activated, and then select P−1 logical channels from the K2 logical channels, and transmit data through the P−1 logical channels and the primary logical channel. The data transmitted through the P−1 logical channels and the data transmitted through the primary logical channel are duplicated. In other words, the P−1 logical channels and the primary logical channel are used for duplication data transmission. In an example, the terminal device may randomly select the P−1 logical channels from the K2 logical channels, or the terminal device may select the P−1 logical channels corresponding to a physical layer transmission resource with relatively good channel quality from the K2 logical channels, or the terminal device may select, from the K2 logical channels, the P logical channels whose corresponding values are the largest or the smallest. In another possible embodiment, the terminal device may alternatively ignore the indication information or ignore the bit sequence.

For example, as shown in FIG. 7a-1, the network device configures four logical channels for the radio bearer 1, and the LCH 1 is the primary logical channel. When indication information sent by the network device includes a bit sequence for the radio bearer 1, four bits in the bit sequence from front to back respectively correspond to usage statuses of the four logical channels the LCH 1 to the LCH 4. When the first bit and the fourth bit are set to 1, it indicates that the LCH 1 and the LCH 4 may be used for duplication data transmission. As shown in FIG. 7a-2, the network device configures three logical channels for the radio bearer 2, and the LCH 1 is the primary logical channel. When the indication information sent by the network device includes the bit sequence for the radio bearer 1, the bit sequence may include two bits, respectively indicating usage statuses of two logical channels (the LCH 2 and the LCH 3). When the second bit is set to 1, it indicates that the LCH 1 and the LCH 3 may be used for duplication data transmission. In another possible example, the network device may alternatively use a bit sequence including three bits. When three logical channels are configured for the radio bearer, and one of the three logical channels is the primary logical channel, first two bits in the bit sequence may respectively indicate usage statuses of two logical channels other than the primary logical channel, and the terminal may not parse the last bit or ignore the last bit. Alternatively, last two bits in the bit sequence may respectively indicate usage statuses of two logical channels other than the primary logical channel, and the terminal may not parse the first bit or ignore the first bit.

For another example, as shown in FIG. 7b-1, the network device configures four logical channels for the radio bearer 1, and the LCH 1 is the primary logical channel. When the first bit and the fourth bit are set to 1, it indicates that the LCH 1 and the LCH 4 may be used for duplication data transmission. As shown in FIG. 7b-2, the network device configures three logical channels for the radio bearer 2, and the LCH 1 is the primary logical channel. When the first bit and the third bit are set to 1, it indicates that the LCH 1 and the LCH 3 may be used for duplication data transmission.

The following provides related descriptions of the indication information in this embodiment of this application.

(1) The indication information may be carried in a message sent by the network device, or the indication information may be a message sent by the network device. For example, the indication information may be an RRC configuration message or a MAC CE message. For example, if the radio bearer is a signaling radio bearer, the indication information may be the RRC configuration message. The RRC configuration message is used to configure the duplication transmission function for the radio bearer on one hand, and is used to indicate the usage statuses of M logical channels associated with the radio bearer on the other hand. If the radio bearer is a data radio bearer, the indication information may be the MAC CE message, and the MAC CE message is used to indicate the usage statuses of the M logical channels associated with the radio bearer. Optionally, before sending the MAC CE message to the terminal device, the network device may further send the RRC configuration message to the terminal device. The RRC configuration message is used to configure the duplication transmission function for the radio bearer. It should be noted that a name and an implementation form of the indication information is not limited in this embodiment of this application.

(2) In an example, the indication information may be indication information for the radio bearer. In other words, the indication information is specifically used to indicate the usage statuses of the M logical channels associated with the radio bearer, and does not indicate a usage status of a logical channel associated with another radio bearer. In another example, the indication information may alternatively be indication information for a plurality of radio bearers. In other words, the indication information may include a plurality of bit sequences, and each bit sequence corresponds to one radio bearer and is used to indicate a state of a logical channel associated with the corresponding radio bearer.

(3) That the indication information may be the indication information for the radio bearer is used as an example. The indication information may include a location index of the radio bearer in ascending or descending order of at least one radio bearer having the duplication transmission function based on an identifier of the at least one radio bearer. Alternatively, the indication information includes a location index that is of the radio bearer in ascending or descending order of at least one radio bearer that has the duplication transmission function and that is associated with the MAC entity receiving the indication information and that is based on an identifier of the at least one radio bearer. For example, the network device configures six radio bearers for the terminal device. The duplication transmission function is configured for four radio bearers, and the four radio bearers are a radio bearer 1, a radio bearer 2, a radio bearer 3, and a radio bearer 4. The radio bearers are sorted as the radio bearer 1, the radio bearer 2, the radio bearer 3, and the radio bearer 4 in ascending order based on identifiers of the radio bearers. In this way, two bits may be used to indicate a location index of a radio bearer. For example, "00" is a location index of the radio bearer 1, "01" is a location index of the radio bearer 2, "10" is a location index of the radio bearer 3, and "11" is a location index of the radio bearer 4. Certainly, three bits or four bits may alternatively be used to indicate a location index of a radio bearer, and details are not described again. In this way, the terminal device may determine, based on the location index included in the indication information, that the bit sequence in the indication information indicates a state of a logical channel associated with a specific radio bearer. In this manner, compared with a case in which the indication information directly includes an ID (which usually includes five bits) of the radio bearer, a quantity of bits included in the indication information can be effectively reduced, and resource overheads can be reduced.

Figure 4B:
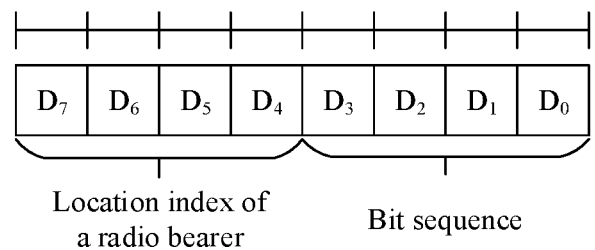
FIG. 4b is a schematic diagram of a location index of a radio bearer and a bit sequence.

It should be noted that the indication information includes the location index of the radio bearer in ascending or descending order of the at least one radio bearer having the duplication transmission function based on the identifier of at least one radio bearer (briefly described below: the indication information includes the location index of the radio bearer). This solution may be implemented based on FIG. 5. In other words, the indication information may include the foregoing bit sequence, and may further include the location index of the radio bearer in ascending or descending order of the at least one radio bearer having the duplication transmission function based on the identifier of the at least one radio bearer. In an example, the location index and the bit sequence of the radio bearer may be shown in FIG. 4b. Alternatively, this may be implemented separately. In other words, the indication information may include the location index of the radio bearer, and whether the indication information includes the bit sequence described above is not specifically limited.

Embodiment 2

Figure 8:
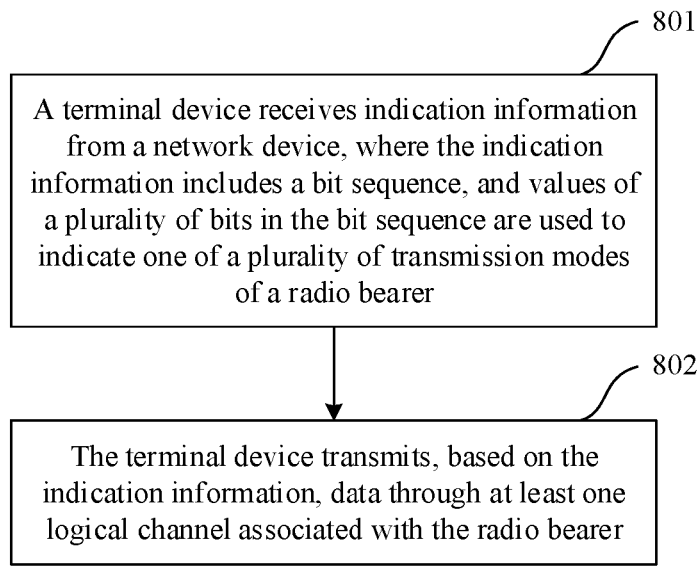
FIG. 8 is a schematic flowchart corresponding to a data transmission method according to an embodiment of this application.

Based on solution 2, FIG. 8 is a schematic flowchart corresponding to a data transmission method according to an embodiment of this application. As shown in FIG. 8, the method includes the following steps.

Step 801: A terminal device receives indication information from a network device, where the indication information includes a bit sequence, values of a plurality of bits in the bit sequence are used to indicate one of a plurality of transmission modes of a radio bearer, a duplication transmission function is configured for the radio bearer, each transmission mode in the plurality of transmission modes includes usage statuses of M logical channels associated with the radio bearer, a quantity of bits in the bit sequence is less than M, and M is an integer greater than or equal to 2.

Step 802: The terminal device transmits, based on the indication information, data through at least one logical channel associated with the radio bearer.

A quantity of bits in the bit sequence may be less than M. In other words, in this embodiment of this application, the usage statuses of the M logical channels are indicated by using a relatively small quantity of bits. This effectively reduces resource overheads.

In this embodiment of this application, a quantity of logical channels associated with the radio bearer may be equal to M, or may be greater than M. For the two cases, the following separately describes specific implementation of transmitting, by the terminal device based on the indication information, data through the at least one logical channel associated with the radio bearer.

Case 1: The quantity of logical channels associated with the radio bearer is greater than M. For example, the quantity of logical channels associated with the radio bearer is equal to M+1. In other words, in addition to the M logical channels, the logical channels associated with the radio bearer may further include one primary logical channel. Further, the primary logical channel may be always in active.

In a possible implementation, a quantity of logical channels in active in each transmission mode may be less than or equal to 2. In this case, for example, a plurality of transmission modes of the radio bearer include any plurality of the following transmission modes 1 to 4.

In the transmission mode 1, a usage status of the primary logical channel is active, and usage statuses of other logical channels associated with the radio bearer are inactive. Correspondingly, when the indication information indicates that the transmission mode of the radio bearer is the transmission mode 1, if the M logical channels are all associated with a first cell group, the terminal device may consider that the duplication transmission function of the radio bearer is deactivated, and may transmit data through the primary logical channel. If a first part of logical channels in the M logical channels are associated with the first cell group and a second part of logical channels in the M logical channels are associated with a second cell group, and the primary logical channel belongs to the first cell group, the terminal device may perform any one of the following: (1) The terminal device rolls back a split bearer operation, in other words, selects a logical channel (for example, a logical channel 1) from the first cell group, selects a logical channel (for example, a logical channel 2) from the second cell group, and transmits data through the logical channel 1 and the logical channel 2. The data transmitted through the logical channel 1 and the data transmitted through the logical channel 2 are not duplicated. In an example, the logical channel 1 may be the primary logical channel or a logical channel that is in the first cell group and whose logical channel ID is the largest or the smallest, or any logical channel in the first cell group. The logical channel 2 may be a logical channel that is in the second cell group and whose logical channel ID is the largest or smallest, or any logical channel in the second cell group. In another example, the network device may preconfigure, by using RRC signaling, a logical channel used when the network device rolls back to the split bearer operation. (2) The terminal device may consider that the duplication transmission function of the radio bearer is deactivated, and then may transmit data through the primary logical channel. In another possible embodiment, the network device may configure, by using the RRC signaling, the terminal to perform (1) or (2).

In the transmission mode 2, usage statuses of the first logical channel in the M logical channels and the primary logical channel are active, usage statuses of other logical channels associated with the radio bearer are inactive, and the data transmitted through the first logical channel and the data transmitted through the primary logical channel are duplicated. Correspondingly, when the indication information indicates that the transmission mode of the radio bearer is the transmission mode 2, the terminal device may perform duplication data transmission through the first logical channel and the primary logical channel.

In the transmission mode 3, usage statuses of the second logical channel in the M logical channels and the primary logical channel are active, usage statuses of other logical channels associated with the radio bearer are inactive, and the data transmitted through the second logical channel and the data transmitted through the primary logical channel are duplicated. Correspondingly, when the indication information indicates that the transmission mode of the radio bearer is the transmission mode 3, the terminal device may perform duplication data transmission through the second logical channel and the primary logical channel.

In the transmission mode 4, usage statuses of the third logical channel in the M logical channels and the primary logical channel are active, usage statuses of other logical channels associated with the radio bearer are inactive, and the data transmitted through the third logical channel and the data transmitted through the primary logical channel are duplicated. Correspondingly, when the indication information indicates that the transmission mode of the radio bearer is the transmission mode 3, the terminal device may perform duplication data transmission through the third logical channel and the primary logical channel.

The M logical channels are sorted based on identifiers IDs of cell groups to which the M logical channels belong and IDs of the M logical channels. For specific implementation, refer to the description in Embodiment 1.

It should be noted that the transmission mode 1 to the transmission mode 4 described above are merely examples. In specific implementation, another possible transmission mode may be further set. This is not specifically limited.

The following uses a specific example for description.

Figures 1, 9A:
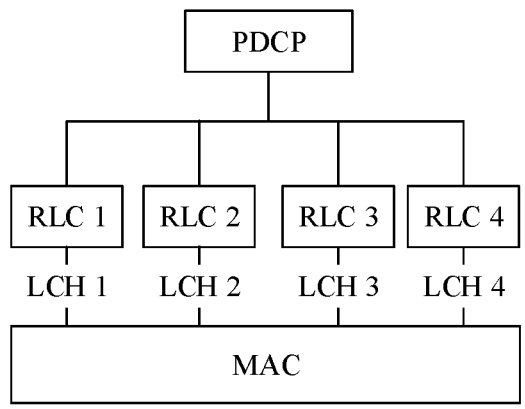
Figures 2, 9A:
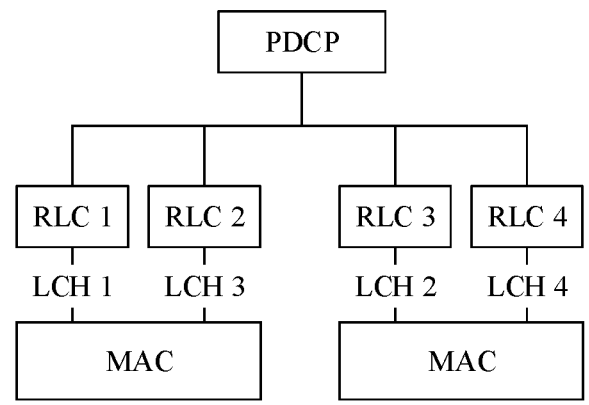

As shown in FIG. 9a-1, the network device configures four logical channels for a radio bearer 1, and an LCH 1 is the primary logical channel. When indication information sent by the network device includes a bit sequence for the radio bearer 1, values of two bits in the bit sequence indicate a transmission mode of the radio bearer 1. 00 (namely, the transmission mode 1) indicates that a usage status of the LCH 1 is active, usage statuses of other logical channels associated with the radio bearer 1 are inactive, and the terminal device may transmit data through only the LCH 1. 01 (namely, the transmission mode 2) indicates that usage statuses of the LCH 1 and the LCH 2 are active, usage statuses of other logical channels associated with the radio bearer 1 are inactive, and the terminal device may perform duplication data transmission through the LCH 1 and the LCH 2. 10 (namely, the transmission mode 3) indicates that usage statuses of the LCH 1 and the LCH 3 are active, usage statuses of other logical channels associated with the radio bearer 1 are inactive, and the terminal device may perform duplication data transmission through the LCH 1 and the LCH 3. 11 (namely, the transmission mode 4) indicates that usage statuses of the LCH 1 and the LCH 4 are active, usage statuses of other logical channels associated with the radio bearer 1 are inactive, and the terminal device may perform duplication data transmission through the LCH 1 and the LCH 4.

As shown in FIG. 9a-2, the network device configures four logical channels for the radio bearer 1, and the LCH 1 is the primary logical channel. When the indication information sent by the network device includes the bit sequence for the radio bearer 1, values of two bits in the bit sequence indicate the transmission mode of the radio bearer 1. 00 (namely, the transmission mode 1) indicates that a usage status of the LCH 1 is active, usage statuses of other logical channels associated with the radio bearer 1 are inactive, and the terminal device may transmit data through only the LCH 1 or roll back to the split bearer. 01 (namely, the transmission mode 2) indicates that usage statuses of the LCH 1 and the LCH 3 are active, usage statuses of other logical channels associated with the radio bearer 1 are inactive, and the terminal device may perform duplication data transmission through the LCH 1 and the LCH 3. 10 (namely, the transmission mode 3) indicates that usage statuses of the LCH 1 and the LCH 2 are active, usage statuses of other logical channels associated with the radio bearer 1 are inactive, and the terminal device may perform duplication data transmission through the LCH 1 and the LCH 2. 11 (namely, the transmission mode 4) indicates that usage statuses of the LCH 1 and the LCH 4 are active, usage statuses of other logical channels associated with the radio bearer 1 are inactive, and the terminal device may perform duplication data transmission through the LCH 1 and the LCH 4.

It may be understood that if less than four logical channels are configured for the radio bearer 1 or a radio bearer 2, for example, three logical channels are configured, when two bits in the bit sequence indicate "11", the terminal device may ignore the indication information or the bit sequence.

Case 2: The quantity of logical channels associated with the radio bearer is equal to M. In other words, the logical channels associated with the radio bearer are the M logical channels.

In an example, a first part of logical channels in the M logical channels are associated with a first cell group, and a second part of logical channels in the M logical channels are associated with a second cell group. A quantity of logical channels associated with the first cell group and a quantity of logical channels associated with the second cell group may be less than or equal to 2.

For example, in the M logical channels, the first logical channel and the second logical channel are associated with the first cell group (which may be a master cell group), and the third logical channel and the fourth logical channel are associated with the second cell group (which may be a secondary cell group). The M logical channels are sorted based on identifiers IDs of cell groups to which the M logical channels belong and IDs of the M logical channels. For specific implementation, refer to the description in Embodiment 1.

In this case, a plurality of transmission modes of the radio bearer include any plurality of the following transmission modes 1 to 6.

In the transmission mode 1, usage statuses of the first logical channel and the second logical channel are active, usage statuses of other logical channels associated with the radio bearer are inactive, and the data transmitted through the first logical channel and the data transmitted through the second logical channel are the same. Correspondingly, when the indication information indicates that the transmission mode of the radio bearer is the transmission mode 1, the terminal device may perform duplication data transmission through the first logical channel and the second logical channel.

In the transmission mode 2, usage statuses of the third logical channel and the fourth logical channel are inactive, usage statuses of other logical channels associated with the radio bearer are inactive, and the data transmitted through the third logical channel and the data transmitted through the fourth logical channel are the same. Correspondingly, when the indication information indicates that the transmission mode of the radio bearer is the transmission mode 2, the terminal device may perform duplication data transmission through the third logical channel and the fourth logical channel.

In the transmission mode 3, usage statuses of the first logical channel and the third logical channel are active, usage statuses of other logical channels associated with the radio bearer are inactive, and the data transmitted through the first logical channel and the data transmitted through the third logical channel are duplicated. Correspondingly, when the indication information indicates that the transmission mode of the radio bearer is the transmission mode 3, the terminal device may perform duplication data transmission through the first logical channel and the third logical channel.

In the transmission mode 4, usage statuses of the first logical channel and the third logical channel are active, usage statuses of other logical channels associated with the radio bearer are inactive, and the data transmitted through the first logical channel and the data transmitted through the third logical channel are not duplicated. Correspondingly, when the indication information indicates that the transmission mode of the radio bearer is the transmission mode 4, the terminal device may perform non-duplication data transmission through the first logical channel and the third logical channel.

In the transmission mode 5, the radio bearer transmit data through a logical channel in the first cell group. For example, the first logical channel or the second logical channel is randomly selected to transmit data, or a logical channel whose logical channel ID is relatively small or relatively large is selected to transmit data. Alternatively, the network device indicates, by using RRC signaling, a logical channel used by the radio bearer to transmit data. Usage statuses of other logical channels associated with the radio bearer are inactive. Correspondingly, when the indication information indicates that the transmission mode of the radio bearer is the transmission mode 5, the terminal device may transmit data through the first logical channel or the second logical channel.

In the transmission mode 6, the radio bearer transmit data through a logical channel in the second cell group. For example, the third logical channel or the fourth logical channel is randomly selected to transmit data, or a logical channel whose logical channel ID is relatively small or relatively large is selected to transmit data. Alternatively, the network device indicates, by using RRC signaling, a logical channel used by the radio bearer to transmit data. Usage statuses of other logical channels associated with the radio bearer are inactive. Correspondingly, when the indication information indicates that the transmission mode of the radio bearer is the transmission mode 6, the terminal device may transmit data through the third logical channel or the fourth logical channel.

It should be noted that the transmission mode 1 to the transmission mode 4 described above are merely examples. In specific implementation, another possible transmission mode may be further set. This is not specifically limited.

The following uses a specific example for description.

Figure 9B:
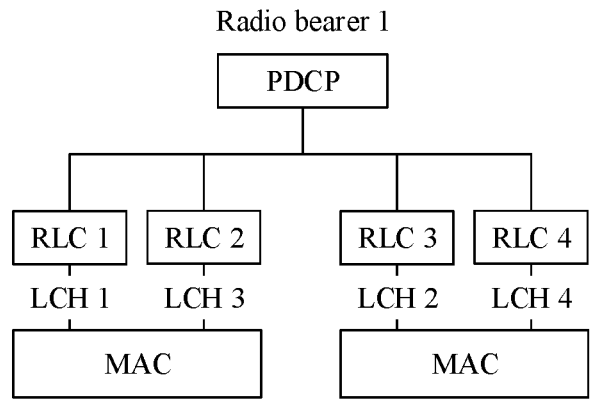
FIG. 9b is still another example diagram according to an embodiment of this application.

Referring to FIG. 9b, the network device configures four logical channels for the radio bearer 1. When the indication information sent by the network device includes the bit sequence for the radio bearer 1, values of two bits in the bit sequence indicate the transmission mode of the radio bearer 1. 00 (namely, the transmission mode 1) indicates that usage statuses of the LCH 1 and the LCH 3 are active, usage statuses of other logical channels associated with the radio bearer 1 are inactive, and the terminal device may perform duplication data transmission through only the LCH 1 and the LCH 3. 01 (namely, the transmission mode 2) indicates that usage statuses of the LCH 2 and the LCH 4 are active, usage statuses of other logical channels associated with the radio bearer 1 are inactive, and the terminal device may perform duplication data transmission through the LCH 2 and the LCH 4. 10 (namely, the transmission mode 3) indicates that usage statuses of the LCH 1 and the LCH 2 (or the LCH 3 and the LCH 4) are active, and usage statuses of other logical channels associated with the radio bearer 1 are inactive, and the terminal device may perform duplication data transmission through the LCH 1 and the LCH 2 (or the LCH 3 and the LCH 4). In this case, one logical channel is selected from each of two cell groups (for example, the cell group 1 and the cell group 2). A specific selection manner is not limited. For example, a logical channel with a largest or smallest logical channel ID may be selected from each cell group, or any logical channel may be selected, alternatively, a logical channel used to roll back to the split bearer is selected. 11 (namely, the transmission mode 4) indicates that the usage statuses of the LCH 1 and the LCH 2 (or the LCH 3 and the LCH 4) are active, usage statuses of other logical channels associated with the radio bearer 1 are inactive, and the terminal device may perform non-duplication data transmission through the LCH 1 and the LCH 4 (or the LCH 2 and the LCH 3).

It may be understood that, if less than four logical channels are configured for the radio bearer 1, for example, three logical channels (for example, only the LCH 1, the LCH 3, and the LCH 2) are configured, when two bits in the bit sequence indicate "01", the terminal device may ignore the indication information or the bit sequence. In another possible embodiment, a specific explanation of the bit sequence may be different from that in the foregoing example. This is not limited in this embodiment of this application. For example, for "11", a logical channel may be selected from the master cell group (for example, a cell group associated with the LCH 1 and the LCH 3) for transmission (a specific selection manner is not limited), or a logical channel may be selected from the secondary cell group (for example, a cell group associated with the LCH 2 and the LCH 4) for transmission (a specific selection manner is not limited).

In still another example, the bit sequence may include three bits that respectively indicate different transmission modes. For example, 000 indicates the transmission mode 1, 001 indicates the transmission mode 2, 010 indicates the transmission mode 3, 100 indicates the transmission mode 4, 101 indicates the transmission mode 5, and 110 indicates the transmission mode 6. It may be understood that, if less than four logical channels are configured for the radio bearer 1, for example, three logical channels (for example, only the LCH 1, the LCH 3, and the LCH 3) are configured, when three bits in the bit sequence indicate '001', the terminal device may ignore the indication information or the bit sequence. In another possible embodiment, a specific explanation of the bit sequence may be different from that in the foregoing example. This is not limited in this embodiment of this application. For example, one of three bits represents activating or deactivating a duplication transmission function of the radio bearer 1. If the bit is "1", it represents activating the duplication transmission function of the radio bearer 1. In this case, remaining two bits may be used to indicate three transmission modes other than activating the duplication transmission function shown in FIG. 9a-1 and FIG. 9a-2.

It should be noted that, for Embodiment 1 and Embodiment 2, in addition to the differences described above, other content in Embodiment 1 and Embodiment 2 may be cross-referenced.

Embodiment 3

In this embodiment of this application, it is assumed that logical channels associated with a radio bearer are M logical channels. The M logical channels are associated with a plurality of cells, for example, a first part of logical channels in the M logical channels are associated with a first cell group, and a second part of logical channels in M the logical channels are associated with a second cell group. The first cell group is configured by a first network device (primary network device), and the second cell group is configured by a second network device. In a possible solution, the first network device indicates usage statuses of the M logical channels by using indication information. However, in this manner, a MAC entity corresponding to the first cell group needs to perceive usage statuses of logical channel of the radio bearer on the MAC entity corresponding to the second cell group. This increases complexity of interaction between protocol layer entities. Based on this, a solution provided in this embodiment of this application is that the first network device indicates usage statuses of the first part of the logical channels by using the indication information, and the second network device indicates usage statuses of the second part of the logical channels by using the indication information. In other words, the first network device or the second network device may control, by using the indication information, the usage statuses of the logical channels configured by the first network device or the second network device, and does not perform cross-network-device control, to avoid complexity caused by the cross-network-device control. It should be noted that, in the solution, for a specific implementation in which the first network device controls, by using the indication information, the usage statuses of the logical channel configured by the first network device, refer to the manner in which the usage statuses of the logical channels are indicated by the indication information in Embodiment 1 or Embodiment 2. Alternatively, another possible manner may be used. This is not specifically limited.

The foregoing mainly describes the solutions provided in the embodiments of this application from a perspective of interaction between the network device and the terminal device. It may be understood that, to implement the foregoing functions, the network device or the terminal device may include a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 10:
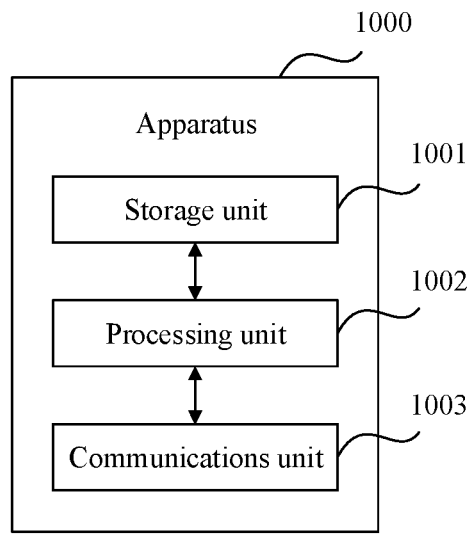
FIG. 10 is a possible example block diagram of an apparatus according to an embodiment of this application.

When an integrated unit (module) is used, FIG. 10 is a possible example block diagram of an apparatus according to an embodiment of this application. The apparatus 1000 may exist in a form of software. The apparatus 1000 may include a processing unit 1002 and a communications unit 1003. The processing unit 1002 is configured to control and manage an action of the apparatus 1000. The communications unit 1003 is configured to support the apparatus 1000 in communicating with another network entity. Optionally, the communications unit 1003 is also referred to as a transceiver unit, and may include a receiving unit and/or a sending unit, which are respectively configured to perform a receiving operation and a sending operation. The apparatus 1000 may further include a storage unit 1001, configured to store program code and/or data that are of the apparatus 1000.

The processing unit 1002 may be a processor or a controller, and may implement or execute various example logical blocks, modules, and circuits described with reference to content disclosed in the embodiments of this application. The communications unit 1003 may be a communications interface, a transceiver, a transceiver circuit, or the like. The communications interface is a general name, and may include a plurality of interfaces during specific implementation. The storage unit 1001 may be a memory.

The apparatus 1000 may be the terminal device in any one of the foregoing embodiments, or may be a chip disposed in the terminal device. The processing unit 1002 may support the apparatus 1000 in performing actions of the terminal device in the foregoing method examples. Alternatively, the processing unit 1002 mainly performs an internal action of the terminal in the method example, and the communications unit 1003 may support communication between the apparatus 1000 and the network device.

Specifically, in an embodiment, the communications unit is configured to receive indication information from a network device, where the indication information includes a bit sequence, a value of an $i^{th}$ bit in the bit sequence is used to indicate a usage status of an $i^{th}$ logical channel in M logical channels associated with a radio bearer, the M logical channels are sorted based on identifiers IDs of cell groups associated with the M logical channels and IDs of the M logical channels, a duplication transmission function is configured for the radio bearer, $i=1, 2, \ldots,$ or M, and M is an integer greater than or equal to 2. The processing unit is configured to transmit, by using the communications unit based on the indication information, data through at least one logical channel associated with the radio bearer.

In a possible design, a quantity of bits in the bit sequence is N, and N is an integer greater than M.

The processing unit is further configured to ignore an $(M+1)^{th}$ bit to an $N^{th}$ bit in the bit sequence.

In a possible design, the usage status of the $i^{th}$ logical channel may be active or inactive. If the usage status of the $i^{th}$ logical channel is active, the $i^{th}$ logical channel is allowed to be used for duplication data transmission. Alternatively, if the usage status of the $i^{th}$ logical channel is inactive, the $i^{th}$ logical channel is prohibited from being used for duplication data transmission.

In a possible design, the processing unit is specifically configured to transmit, by using the communications unit based on usage statuses of the M logical channels, data through at least a logical channel that is in the M logical channels and whose usage status is active.

In a possible design, the processing unit is specifically configured to: if the M bits indicate that usage statuses of K1 logical channels in the M logical channels are active, and $0<K1 \leq P$, the terminal device transmits, by using the communications unit, data through the K1 logical channels, where when K1 is greater than 1, the data transmitted through the K1 logical channels is duplicated, and P is a maximum quantity of logical channels that are in the logical channels associated with the radio bearer and that are active.

In a possible design, when the M logical channels are all associated with a first cell group, if K1=0, the processing unit is specifically configured to transmit, by using the communications unit, data through any one of the M logical channels, or the terminal device ignores the indication information or the bit sequence; or when a first part of logical channels in the M logical channels are associated with a first cell group and a second part of logical channels in the M logical channels are associated with a second cell group, if K1=0, the processing unit is specifically configured to transmit, by using the communications unit, data through a first logical channel in the M logical channels, or perform, by using the communications unit, non-duplication data transmission through a second logical channel in the first cell group and a third logical channel in the second cell group, or ignore the indication information or the bit sequence.

In a possible design, if K1>P, the processing unit is specifically configured to transmit, by using the communications unit, data through P logical channels in the K1 logical channels, where the data transmitted through the P logical channels is duplicated.

In a possible design, the logical channels associated with the radio bearer includes the M logical channels and a primary logical channel, if the M bits indicate that usage statuses of K2 logical channels in the M logical channels are active, and $0<K2 \leq P-1$, the processing unit is specifically configured to transmit, by using the communications unit, data through the K2 logical channels and the primary logical channel, where the data transmitted through the K2 logical channels and the data transmitted through the primary logical channel are duplicated, and P is a maximum quantity of logical channels that are in the logical channels associated with the radio bearer and that are active.

In a possible design, when the logical channels associated with the radio bearer are all associated with a first cell group, if K2=0, the processing unit is specifically configured to transmit, by using the communications unit, data through the primary logical channel, or ignore the indication information or the bit sequence; or when a first part of logical channels in the M logical channels are associated with a first cell group, a second part of logical channels in the M logical channels are associated with a second cell group, and the first part of logical channels include the primary logical channel, if K2=0, the processing unit is specifically configured to transmit, by using the communications unit, data through the primary logical channel, or transmit, by using the communications unit, data through the primary logical channel and a fourth logical channel in the second cell group, where the data transmitted through the primary logical channel and the data transmitted through the fourth logical channel are not duplicated, or the terminal device ignores the indication information or the bit sequence.

In a possible design, if K2>P−1, the processing unit is specifically configured to transmit, by using the communications unit, data through P−1 logical channels in the K2 logical channels and the primary logical channel, where the data transmitted through the P−1 logical channels and the data transmitted through the primary logical channel are duplicated.

In a possible design, that the M logical channels are sorted based on identifiers IDs of cell groups associated with the M logical channels and IDs of the M logical channels includes:

the M logical channels are sorted in ascending or descending order based on IDs of logical channels associated with each cell group, where logical channels associated with a cell group with a larger ID are ranked first, or logical channels associated with a cell group with a smaller ID are ranked first; or the M logical channels are sorted in ascending or descending order based on values respectively corresponding to the M logical channels, where the M logical channels include the first logical channel, and a value corresponding to the first logical channel is obtained based on an ID of a cell group to which the first logical channel belongs, an ID of the first logical channel, and a maximum quantity of logical channels included in the cell groups to which the M logical channels belong.

In a possible design, the indication information further includes a location index of the radio bearer in ascending or descending order of at least one radio bearer having the duplication transmission function based on an identifier of the at least one radio bearer.

Specifically, in an embodiment, a communications unit is configured to receive indication information from a network device, where the indication information includes a bit sequence, values of a plurality of bits in the bit sequence are used to indicate one of a plurality of transmission modes of a radio bearer, a duplication transmission function is configured for the radio bearer, each transmission mode in the plurality of transmission modes includes usage statuses of M logical channels associated with the radio bearer, a quantity of bits in the bit sequence is less than M, and M is an integer greater than or equal to 2; and a processing unit is configured to transmit, by using the communications unit based on the indication information, data through at least one logical channel associated with the radio bearer.

In a possible design, logical channels associated with the radio bearer include the M logical channels and a primary logical channel; and the plurality of transmission modes include any one or more of the following:

a transmission mode 1, where a usage status of the primary logical channel is active, and usage statuses of other logical channels associated with the radio bearer are inactive;

a transmission mode 2, where usage statuses of the first logical channel in the M logical channels and the primary logical channel are active, usage statuses of other logical channels associated with the radio bearer are inactive, and the data transmitted through the first logical channel and the data transmitted through the primary logical channel are duplicated;

a transmission mode 3, where usage statuses of the second logical channel in the M logical channels and the primary logical channel are active, usage statuses of other logical channels associated with the radio bearer are inactive, and the data transmitted through the second logical channel and the data transmitted through the primary logical channel are duplicated; and a transmission mode 4, where usage statuses of the third logical channel in the M logical channels and the primary logical channel are active, usage statuses of other logical channels associated with the radio bearer are inactive, and the data transmitted through the third logical channel and the data transmitted through the primary logical channel are duplicated, where the M logical channels are sorted based on identifiers IDs of cell groups to which the M logical channels belong and IDs of the M logical channels.

In a possible design, the first logical channel and the second logical channel in the M logical channels are associated with a first cell group, the third logical channel and the fourth logical channel in the M logical channels are associated with a second cell group, and the M logical channels are sorted based on identifiers IDs of cell groups associated with the M logical channels and IDs of the M logical channels; and the plurality of transmission modes of the radio bearer include any one or more of the following:

a transmission mode 1, where usage statuses of the first logical channel and the second logical channel are active, usage statuses of other logical channels associated with the radio bearer are inactive, and the data transmitted through the first logical channel and the data transmitted through the second logical channel are duplicated;

a transmission mode 2, where usage statuses of the third logical channel and the fourth logical channel are inactive, usage statuses of other logical channels associated with the radio bearer are inactive, and the data transmitted through the third logical channel and the data transmitted through the fourth logical channel are the same;

a transmission mode 3, where usage statuses of the first logical channel and the third logical channel are active, usage statuses of other logical channels associated with the radio bearer are inactive, and the data transmitted through the first logical channel and the data transmitted through the third logical channel are duplicated;

a transmission mode 4, where usage statuses of the first logical channel and the third logical channel are active, usage statuses of other logical channels associated with the radio bearer are inactive, and the data transmitted through the first logical channel and the data transmitted through the third logical channel are not duplicated;

a transmission mode 5, where a usage status of the first logical channel or the second logical channel is active, and usage statuses of other logical channels associated with the radio bearer are inactive; and a transmission mode 6, where a usage status of the third logical channel or the fourth logical channel is active, and usage statuses of other logical channels associated with the radio bearer are inactive.

It should be noted that, in this embodiment of this application, the unit (module) division is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium may be any medium that can store program code, such as a memory.

Figure 11:
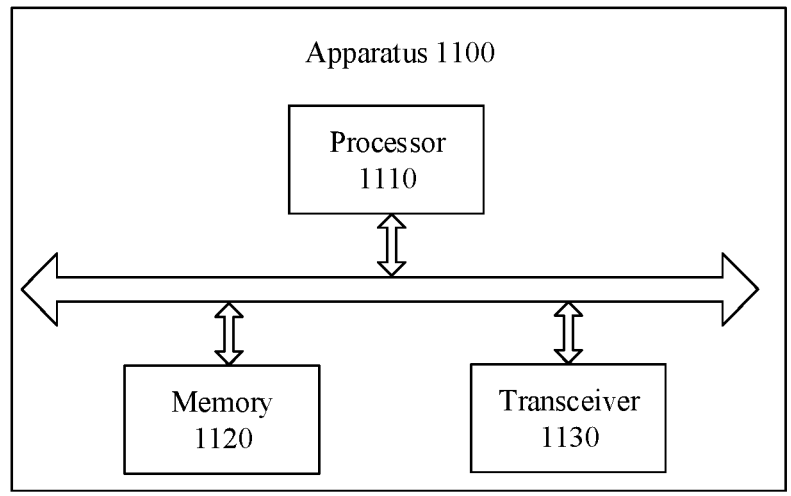
FIG. 11 is a schematic structural diagram of an apparatus according to an embodiment of this application.

FIG. 11 is a schematic structural diagram of an apparatus. The apparatus 1100 includes a processor 1110, a memory 1120, and a transceiver 1130. In an example, the apparatus 1100 may implement a function of the apparatus 1000 shown in FIG. 10. Specifically, a function of the communications unit 1003 shown in FIG. 10 may be implemented by the transceiver, a function of the processing unit 1002 may be implemented by the processor, and a function of the storage unit 1001 may be implemented by the memory. In another example, the apparatus 1100 may be the terminal device in the foregoing method embodiment. The apparatus 1100 may be configured to implement the method that corresponds to the terminal device and that is described in the foregoing method embodiments. For details, refer to the descriptions in the foregoing method embodiments.

Figure 12:
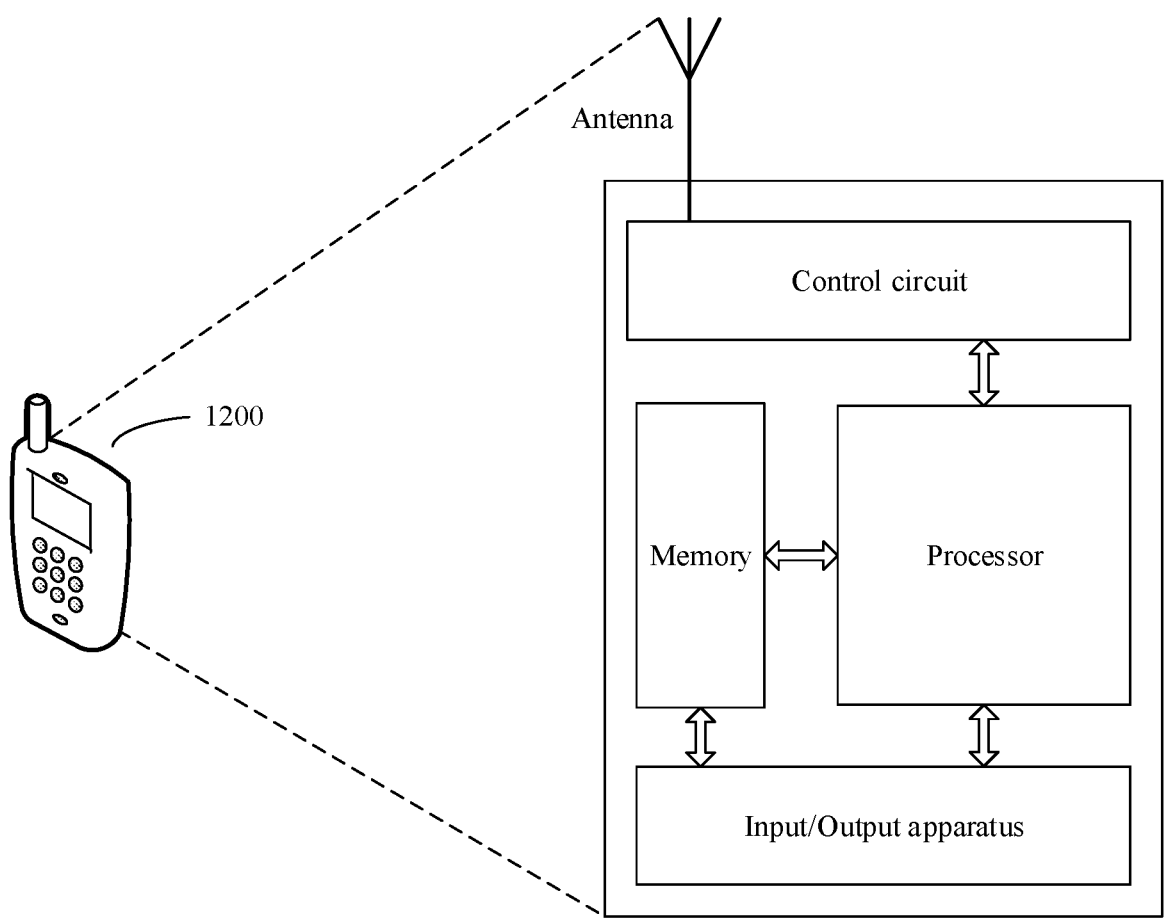
FIG. 12 is a schematic structural diagram of a terminal device according to an embodiment of this application.

FIG. 12 is a schematic structural diagram of a terminal device 1200 according to an embodiment of this application. For ease of description, FIG. 12 shows only main components of the terminal device. As shown in FIG. 12, the terminal device 1200 includes a processor, a memory, a control circuit, an antenna, and an input/output apparatus. The terminal device 1200 may be used in the system architecture shown in FIG. 1, and performs functions of the terminal device in the foregoing method embodiments.

The processor is mainly configured to process a communications protocol and communications data, control the entire terminal device, execute a software program, and process data of the software program, for example, configured to control the terminal device in performing the actions described in the foregoing method embodiments. The memory is mainly configured to store a software program and data. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in a storage unit, explain and execute an instruction of the software program, and process the data of the software program. When data needs to be sent in a wireless manner, the processor performs baseband processing on the to-be-sent data, and outputs a baseband signal to the radio frequency circuit. After performing radio frequency processing on the baseband signal, the radio frequency circuit sends the radio frequency signal by using the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 12 shows only one memory and one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communications data. The central processing unit is mainly configured to: control the entire terminal device, execute the software program, and process the data of the software program. The processor in FIG. 12 integrates functions of the baseband processor and the central processing unit. A person skilled in the art may understand that the baseband processor and the central processing unit may be individually independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a software program form. The processor executes the software program, to implement a baseband processing function.

The terminal device 1200 shown in FIG. 12 can implement the processes related to the terminal device in the method embodiment shown in FIG. 5 or FIG. 8. The operations and/or the functions of the modules in the terminal device 1200 are intended to implement corresponding procedures in the foregoing method embodiments. For details, refer to the descriptions in the foregoing method embodiments. To avoid repetition, detailed descriptions are properly omitted herein.

In an implementation process, the steps of the methods in the embodiments may be performed by using a hardware integrated logical circuit in the processor, or by using instructions in a form of software. The steps of the method disclosed with reference to the embodiments of this application may be directly performed by a hardware processor, or may be performed by using a combination of hardware in the processor and a software module.

It should be noted that the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof, or may be a combination of processors implementing a computing function, for example, a combination of one or more microprocessors or a combination of a DSP and a microprocessor. The general purpose processor may be a microprocessor, or the processor may be any conventional processor or the like.

It may be understood that the memory or the storage unit in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or instructions are loaded and executed on the computer, the procedure or functions according to the embodiments of this application are all or partially generated. The computer may be a general-purpose computer, a dedicated computer, a computer network, or other programmable apparatuses. The computer program or instruction may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in the embodiments of the present invention may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal device. Alternatively, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example description of the embodiments of this application defined by the accompanying claims, and is considered as any of or all modifications, variations, combinations or equivalents that cover the scope of the embodiments of this application.

What is claimed is:

1. A data transmission method applied to a terminal device or a chip in the terminal device, the method comprising:
receiving indication information from a network device,
wherein the indication information comprises a bit sequence of M bits,
wherein a value of an $i^{th}$ bit in the bit sequence indicates a usage status of an $i^{th}$ logical channel in M logical channels,
wherein the M logical channels and a primary logical channel are associated with a radio bearer,
wherein the M logical channels are secondary logical channels,
wherein the M logical channels are sorted based on identifiers (IDs) of cell groups associated with the M logical channels and IDs of the M logical channels,
wherein the radio bearer is configured with a duplication transmission function, and
wherein i=1, 2, . . . , or M, and M is an integer greater than or equal to 2; and
transmitting data through at least one logical channel in the M logical channels, wherein transmitting the data comprises:
for K2>0, transmitting data through K2 logical channels and the primary logical channel based on the bit sequence of M bits indicating that usage statuses of the K2 logical channels in the M logical channels are active, and K2≤P−1,
wherein the data transmitted through the K2 logical channels and the data transmitted through the primary logical channel are duplicated,
wherein P is a maximum quantity of active logical channels in the M logical channels and the primary logical channel,
wherein a first part of the M logical channels is associated with a master cell group and a second part of the M logical channels is associated with a secondary cell group, and
wherein the primary logical channel is associated with the master cell group; and for K2=0, transmitting data through the primary logical channel and a logical channel in the secondary cell group,
- wherein the data transmitted through the primary logical channel and the data transmitted through the logical channel of the secondary cell group are not duplicated.

2. The method according to claim 1, wherein a quantity of bits in the bit sequence is N, and N is an integer greater than M; and the method further comprises ignoring an $(M+1)^{th}$ bit to an $N^{th}$ bit in the bit sequence.

3. The method according to claim 1, further comprising receiving radio resource control (RRC) signaling from the network device, wherein the RRC signaling indicates the logical channel in the secondary cell group.

4. The method according to claim 1, wherein the M logical channels are sorted in ascending order based on IDs of logical channels associated with each cell group, wherein logical channels associated with a cell group with a smaller ID are ranked first.

5. The method according to claim 1, wherein logical channels associated with the master cell group are ranked first, and logical channels associated with the secondary cell group are ranked last.

6. A data transmission method applied to a network device or a chip in the network device, the method comprising:
- sending indication information to a terminal device,
  - wherein the indication information comprises a bit sequence of M bits,
  - wherein a value of an $i^{th}$ bit in the bit sequence indicates a usage status of an $i^{th}$ logical channel in the M logical channels,
  - wherein the M logical channels and a primary logical channel are associated with a radio bearer,
  - wherein the M logical channels are secondary logical channels,
  - wherein the M logical channels are sorted based on identifiers (IDs) of cell groups associated with the M logical channels and IDs of the M logical channels,
  - wherein the radio bearer is configured with a duplication transmission function, and
  - wherein i=1, 2, . . . , or M, and M is an integer greater than or equal to 2; and
- receiving data through at least one logical channel associated with the radio bearer, wherein receiving the data comprises:
  - receiving data through K2 logical channels in the M logical channels and the primary logical channel in response to the M bits indicating usage statuses of the K2 logical channels are active, and 0<K2≤P-1,
    - wherein the data received through the K2 logical channels and the data received through the primary logical channel are duplicated,
    - wherein P is a maximum quantity of active logical channels in the M logical channels,
    - wherein a first part of logical channels in the M logical channels is associated with a master cell group and a second part of logical channels in the M logical channels is associated with a secondary cell group, and
    - wherein the primary logical channel is associated with the master cell group;
  - receiving data through the primary logical channel and the logical channel in the secondary cell group based on K2=0,
    - wherein the data transmitted through the primary logical channel and the data transmitted through the logical channel are not duplicated; and
- sending radio resource control (RRC) signaling to the terminal device, wherein the RRC signaling indicates the logical channel in the secondary cell group.

7. The method according to claim 6, wherein the M logical channels are sorted in ascending order based on IDs of logical channels associated with each cell group, wherein logical channels associated with a cell group with a smaller ID are ranked first.

8. The method according to claim 7, wherein logical channels associated with a master cell group are ranked first, and logical channels associated with a secondary cell group are ranked last.

9. An apparatus comprising a processor and a memory storing instructions that, when executed by the processor, cause the apparatus to be configured to perform at least the following operations:
- receiving indication information from a network device,
  - wherein the indication information comprises a bit sequence of M bits,
  - wherein a value of an $i^{th}$ bit in the bit sequence indicates a usage status of an $i^{th}$ logical channel in M logical channels,
  - wherein the M logical channels and a primary logical channel are associated with a radio bearer,
  - wherein the M logical channels are secondary logical channels,
  - wherein the M logical channels are sorted based on identifiers (IDs) of cell groups associated with the M logical channels and IDs of the M logical channels, and
  - wherein the radio bearer is configured with a duplication transmission function, i=1, 2, . . . , or M, and M is an integer greater than or equal to 2; and
- transmitting data through at least one logical channel in the M logical channels, wherein transmitting the data comprises:
  - for K2>0, transmitting data through K2 logical channels in the M logical channels and the primary logical channel based on the M bits indicating that usage statuses of the K2 logical channels in the M logical channels are active, and K2≤P-1,
    - wherein the data transmitted through the K2 channels and the data transmitted through the primary logical channel are duplicated,
    - wherein P is a maximum quantity of active logical channels in the logical channels,
    - wherein a first part of logical channels in the M logical channels are associated with a master cell group and a second part of logical channels in the M logical channels are associated with a secondary cell group, and
    - wherein the primary logical channel is associated with the master cell group; and
  - for K2=0, transmitting data through the primary logical channel and a logical channel in the secondary cell group,
    - wherein the data transmitted through the primary logical channel and the data transmitted through the logical channel of the secondary cell group are not duplicated.

10. The apparatus according to claim 9, wherein a quantity of bits in the bit sequence is N, and N is an integer greater than M; and the method further comprises: ignoring an $(M+1)^{th}$ bit to an $N^{th}$ bit in the bit sequence.

11. The apparatus according to claim 9, wherein the operations further comprise receiving radio resource control (RRC) signaling from the network device, wherein the RRC signaling indicates the logical channel in the secondary cell group.

12. The apparatus according to claim 9, wherein the M logical channels are sorted in ascending order based on IDs of logical channels associated with each cell group, and wherein logical channels associated with a cell group with a smaller ID are ranked first.

13. The apparatus according to claim 12, wherein logical channels associated with a master cell group are ranked first, and logical channels associated with a secondary cell group are ranked last.

14. An apparatus comprising a processor and a memory storing instructions that, when executed by the processor, cause the apparatus to be configured to provide at least the following operations:
  sending indication information to a terminal device,
    wherein the indication information comprises a bit sequence of M bits,
    wherein a value of an $i^{th}$ bit in the bit sequence indicates a usage status of an $i^{th}$ logical channel in the M logical channels,
    wherein the M logical channels and a primary logical channel are associated with a radio bearer,
    wherein the M logical channels are secondary logical channels,
    wherein the M logical channels are sorted based on identifiers (IDs) of cell groups associated with the M logical channels and IDs of the M logical channels,
    wherein the radio bearer is configured with a duplication transmission function, and
    wherein i=1, 2, . . . , or M, and M is an integer greater than or equal to 2; and
  receiving data through at least one logical channel associated with the radio bearer, wherein receiving the data comprises:
    receiving the data through K2 logical channels in the M logical channels and the primary logical channel in response to the M bits indicating usage statuses of the K2 logical channels are active based on $0<K2\leq P-1$,
      wherein the data received through the K2 logical channels and the data received through the primary logical channel are duplicated,
      wherein P is a maximum quantity of active logical channels in the M logical channels,
      wherein a first part of logical channels in the M logical channels is associated with a master cell group and a second part of logical channels in the M logical channels is associated with a secondary cell group, and
      wherein the primary logical channel is associated with the master cell group; and
    receiving the data through the primary logical channel and the logical channel in the secondary cell group based on K2=0,
      wherein the data transmitted through the primary logical channel and the data transmitted through the logical channel are not duplicated; and
  sending radio resource control (RRC) signaling to the terminal device, wherein the RRC signaling indicates the logical channel in the secondary cell group.

15. The apparatus according to claim 14, wherein the M logical channels are sorted in ascending order based on IDs of logical channels associated with each cell group, wherein logical channels associated with a cell group with a smaller ID are ranked first.

16. The apparatus according to claim 15, wherein logical channels associated with a master cell group are ranked first, and logical channels associated with a secondary cell group are ranked last.

* * * * *

UNITED STATES PATENT AND TRADEMARK OFFICE
CERTIFICATE OF CORRECTION

PATENT NO. : 12,052,727 B2  
APPLICATION NO. : 17/489455  
DATED : July 30, 2024  
INVENTOR(S) : Fan et al.

Page 1 of 1

It is certified that error appears in the above-identified patent and that said Letters Patent is hereby corrected as shown below:

On the Title Page

(56) References Cited, Other Publications, Right-Hand Column, Line 14: reads as "1-77, 3GPP TS 36.331 V15.4.0, pp. 1-933, 3rd Generation Partner-" should read -- 1-77, 3rd Generation Partner- --.

Page 2: (56) References Cited, Other Publications, Right-Hand Column, Line 5-6: reads as "Stage 2 (Release 15)," 3GPP TS 38.300 V.15.4.0, pp. 1-97, 3GPP TS 36.331 V15.4.0, pp. 1-933, 3rd Generation Partnership Project," should read -- Stage 2 (Release 15)," 3GPP TS 38.300 V.15.4.0, pp. 1-97, 3rd Generation Partnership Project, --.

Signed and Sealed this  
Twenty-ninth Day of April, 2025

Coke Morgan Stewart  
*Acting Director of the United States Patent and Trademark Office*